(12) United States Patent
Ueda

(10) Patent No.: US 10,772,027 B2
(45) Date of Patent: Sep. 8, 2020

(54) BASE STATION APPARATUS AND INTER-BASE-STATION GATEWAY APPARATUS

(71) Applicant: NEC CORPORATION, Tokyo (JP)

(72) Inventor: Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 15/555,671

(22) PCT Filed: Dec. 22, 2015

(86) PCT No.: PCT/JP2015/006366
§ 371 (c)(1),
(2) Date: Sep. 5, 2017

(87) PCT Pub. No.: WO2016/151653
PCT Pub. Date: Sep. 29, 2016

(65) Prior Publication Data
US 2018/0049098 A1 Feb. 15, 2018

(30) Foreign Application Priority Data
Mar. 20, 2015 (JP) .................................. 2015-058155

(51) Int. Cl.
*H04W 40/22* (2009.01)
*H04W 88/16* (2009.01)
(Continued)

(52) U.S. Cl.
CPC ....... *H04W 40/22* (2013.01); *H04W 36/0005* (2013.01); *H04W 36/0055* (2013.01);
(Continued)

(58) Field of Classification Search
None
See application file for complete search history.

(56) References Cited

U.S. PATENT DOCUMENTS

| | | | |
|---|---|---|---|
| 2010/0039991 A1* | 2/2010 | Godin | H04W 24/02 370/328 |
| 2010/0125631 A1* | 5/2010 | Zhang | H04W 28/18 709/204 |

(Continued)

FOREIGN PATENT DOCUMENTS

| | | |
|---|---|---|
| CN | 102076039 A | 5/2011 |
| CN | 103220815 A | 7/2013 |

(Continued)

OTHER PUBLICATIONS

Communication dated Sep. 3, 2018, issued by the European Patent Office in corresponding European Application No. 15886210.2.
(Continued)

Primary Examiner — Hassan A Phillips
Assistant Examiner — Gautam Sharma
(74) Attorney, Agent, or Firm — Sughrue Mion, PLLC

(57) ABSTRACT

A base station apparatus (1) is configured to send a first information element to an inter-base-station gateway (3). The first information element explicitly or implicitly indicates whether a relay operation is necessary. The relay operation is an operation in which the inter-base-station gateway (3) relays a data packet destined for or sent from a radio terminal between the base station apparatus (1) and another base station (2). It is thus, for example, possible to contribute to enabling a base station or an inter-base-station gateway to select whether a relay operation by the inter-base-station gateway should be performed at the time of an inter-base-station handover.

16 Claims, 20 Drawing Sheets

(51) Int. Cl.
H04W 92/20 (2009.01)
H04W 36/04 (2009.01)
H04W 36/00 (2009.01)
H04W 36/08 (2009.01)

(52) U.S. Cl.
CPC .......... *H04W 36/04* (2013.01); *H04W 36/08* (2013.01); *H04W 88/16* (2013.01); *H04W 92/20* (2013.01)

(56) References Cited

U.S. PATENT DOCUMENTS

| | | | |
|---|---|---|---|
| 2012/0015683 A1* | 1/2012 | Gao | H04W 8/26 455/524 |
| 2013/0150021 A1 | 6/2013 | Oh et al. | |
| 2013/0294403 A1* | 11/2013 | Srinivasan | H04W 36/165 370/331 |
| 2014/0328246 A1* | 11/2014 | Xu | H04W 36/08 370/315 |
| 2015/0078248 A1* | 3/2015 | Han | H04W 76/12 370/315 |
| 2015/0351138 A1* | 12/2015 | Metsala | H04W 76/10 370/254 |
| 2016/0044544 A1* | 2/2016 | Yoshizawa | H04W 36/0016 370/331 |
| 2016/0174113 A1 | 6/2016 | Kurokawa et al. | |
| 2016/0227594 A1 | 8/2016 | Gao et al. | |

FOREIGN PATENT DOCUMENTS

| | | |
|---|---|---|
| JP | 2012-227974 A | 11/2012 |
| JP | 2013-150204 A | 8/2013 |
| KR | 10-1264217 B1 | 5/2013 |
| WO | 2011/142624 A3 | 11/2011 |
| WO | 2014169687 A1 | 10/2014 |
| WO | 2014177004 A1 | 11/2014 |
| WO | 2015015773 A1 | 2/2015 |

OTHER PUBLICATIONS

3GPP TS 36.300, V12.4.0, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Dec. 2014, pp. 1-251.
"TAI-Assisted Intra-HeNB-GW X2 Handover", Ericsson, 3GPP TSG-RAN WG3#74, R3-113003, Nov. 14, 2011, 3 pages.
"Handover message routing for relays", NTT DOCOMO, Inc., 3GPP TSG-RAN WG3 Ad-hoc R3-101934, 3GPP, Jun. 29, 2010, 3 pages.
"The enhancement for peer discovery", ZTE, 3GPP TSG-RAN WG3, Meeting #83, R3-140040, 3GPP, Feb. 10, 2014, 2 pages.
International Search Report for PCT/JP2015/006366 dated Feb. 16, 2016 [PCT/ISA/210].
Written Opinion for PCT/JP2015/006366 dated Feb. 16, 2016 [PCT/ISA/237].
Communication dated Feb. 21, 2020, from the Intellectual Property of India in application No. 201717031874.
NTT Docomo, Inc., "Analysis on necessity of optimized HeNB mobility", 3GPP TSG-RAN WG3 #68, R3-101562, May 10-14, 2010, pp. 1-3 (total 3 pages).
New Postcom, "Discussion of enhanced mobility solutions between MeNB and HeNB", 3GPP TSG-RAN WG3 AH Meeting, R3-101850, Jun. 29-Jul. 1, 2010, pp. 1-6 (total 6 pages).
Communication dated Jul. 3, 2020 from the China National Intellectual Property Administration in Application No. 201580077837.9.

* cited by examiner

| CASE | DIRECT PATH AVAILABILITY | U-PLANE RELAY CAPABILITY OF X2 GW | EXPLICIT OR IMPLICIT RELAY REQUEST TO X2 GW FROM SOURCE (H)eNB | IMPLEMENTATION OF U-PLANE RELAY BY X2 GW |
|---|---|---|---|---|
| CASE 1 | YES | YES | NOT SET | NOT PERFORMED |
| CASE 2 | YES | NO | NOT SET | NOT PERFORMED |
| CASE 3 | NO | YES | SET | PERFORMED |
| CASE 4 | NO | NO | NOT SET | NOT PERFORMED |

Fig. 7

| CASE | DIRECT PATH AVAILABILITY | U-PLANE RELAY CAPABILITY OF X2 GW | SETTING OF DIRECT PATH UNAVAILABILITY IE BY SOURCE (H)eNB | SETTING OF DL FORWARDING IE BY SURCE (H)eNB | IMPLEMENTATION OF U-PLANE RELAY BY X2 GW |
|---|---|---|---|---|---|
| CASE 1 | YES | YES | NOT SET | SET | NOT PERFORMED |
| CASE 2 | YES | NO | NOT SET | SET | NOT PERFORMED |
| CASE 3 | NO | YES | SET | SET | PERFORMED |
| CASE 4 | NO | NO | SET | NOT SET | NOT PERFORMED |

Fig. 8

| CASE | DIRECT PATH AVAILABILITY | U-PLANE RELAY CAPABILITY OF X2 GW | EXPLICIT OR IMPLICIT RELAY REQUEST TO X2 GW FROM TARGET (H)eNB | IMPLEMENTATION OF U-PLANE RELAY BY X2 GW |
|---|---|---|---|---|
| CASE 1 | YES | YES | NOT SET | NOT PERFORMED |
| CASE 2 | YES | NO | NOT SET | NOT PERFORMED |
| CASE 3 | NO | YES | SET | PERFORMED |
| CASE 4 | NO | NO | NOT SET | NOT PERFORMED |

Fig. 9

| CASE | DIRECT PATH AVAILABILITY | U-PLANE RELAY CAPABILITY OF X2 GW | SETTING OF DIRECT PATH UNAVAILABILITY IE BY TARGET (H)eNB | SETTING OF UL GTP TUNNEL ENDPOINT IE BY TARGET (H)eNB | IMPLEMENTATION OF U-PLANE RELAY BY X2 GW |
|---|---|---|---|---|---|
| CASE 1 | YES | YES | NOT SET | SET | NOT PERFORMED |
| CASE 2 | YES | NO | NOT SET | SET | NOT PERFORMED |
| CASE 3 | NO | YES | SET | SET | PERFORMED |
| CASE 4 | NO | NO | SET | NOT SET | NOT PERFORMED |

9.1.2.24 X2AP MESSAGE TRANSFER

| IE/Groupe Name | Presence | Range | IE type and reference | Semantics description | Criticality | Assigned Criticality |
|---|---|---|---|---|---|---|
| Message Type | M | | | | YES | reject |
| RNL header | M | | 9.2.68 | | YES | reject |
| X2AP Message | O | | OCTET STRING | Includes any X2AP message execpt the X2AP MESSAGE TRANSFER message | YES | reject |
| U-Plane Relay Capability | O | | 9.2.x | | YES | ignore |
| Direct Path Unavailability | O | | BOOLEAN | | YES | ignore |
| >E-RABs To Be Setup List | | 0 .. 1 | | | - | - |
| >>E-RABs To Be Setup Item | | 1 .. <maxnoofBearers> | | | EACH | ignore |
| >>>E-RAB ID | M | | 9.2.23 | | - | - |
| >>>UL GTP Tunnel Endpoint | M | | GTP Tunnel Endpoint 9.2.1 | X2 GW endpoint of the X2 transport bearer for forwarding UL PDUs | - | - |
| >>>DL GTP Tunnel Endpoint | M | | GTP Tunnel Endpoint 9.2.1 | X2 GW endpoint of the X2 transport bearer for forwarding DL PDUs | - | - |

Fig. 15A 9.1.2.24 X2AP MESSAGE TRANSFER

| IE/Groupe Name | Presence | Range | IE type and reference | Semantics description | Criticality | Assigned Criticality |
|---|---|---|---|---|---|---|
| Message Type | M | | | | YES | reject |
| RNL header | M | | 9.2.68 | | YES | reject |
| X2AP Message | O | | OCTET STRING | Includes any X2AP message execpt the X2AP MESSAGE TRANSFER message | YES | reject |
| Message Type of X2AP Message | O | | 9.2.13 | | YES | ignore |
| U-Plane Relay Capability | O | | 9.2.x | | YES | ignore |
| Direct Path Unavailability | O | | BOOLEAN | | YES | ignore |
| >E-RABs To Be Setup List | - | 0..1 | | | - | - |
| >>E-RABs To Be Setup Item | - | 1..<maxnoofBearers> | | | EACH | ignore |

| | | | | |
|---|---|---|---|---|
| >>>E-RAB ID | M | | 9.2.23 | |
| >>>E-RAB Level QoS Parameters | M | | 9.2.9 | Including necessary QoS parameters |
| >>>DL Forwarding | O | | 9.2.5 | |
| >>>UL GTP Tunnel Endpoint | M | | GTP Tunnel Endpoint 9.2.1 | X2 GW endpoint of the X2 transport bearer for forwarding UL PDUs |
| >>>DL GTP Tunnel Endpoint | M | | GTP Tunnel Endpoint 9.2.1 | X2 GW endpoint of the X2 transport bearer for forwarding DL PDUs |
| ... | ... | ... | ... | ... |

Fig. 17A 9.2.3.29  X2 TNL Configuration Info

| IE/Groupe Name | Presence | Range | IE type and reference | Semantics description | Criticality | Assigned Criticality |
|---|---|---|---|---|---|---|
| eNB X2 Transport Layer Addresses | | 1..<maxnoofeNBX2TLAs> | | | | |
| >Transport Layer Address | M | | 9.2.2.1 | Transport Layer Addresses for X2 SCTP end-point. | | |
| eNB X2 Extended Transport Layer Addresses | | 1..<maxnoofeNBX2ExtTLAs> | | | YES | ignore |
| >IP-Sec Transport Layer Address | O | | 9.2.2.1 | Transport Layer Addresses for IP-Sec end-point. | - | - |
| >eNB GTP Transport Layer Addresses | | 1..<maxnoofeNBX2GTPTLAs> | | | - | - |
| >>GTP Transport Layer Address | M | | 9.2.2.1 | GTP Transport Layer Addresses for GTP endpoints (used for data forwarding over X2). | | |

| eNB Indirect X2 Transport Layer Addresses | | 1..<br><maxnoofeNB<br>X2TLAs> | ... | YES | ignore |
|---|---|---|---|---|---|
| >Transport Layer Address | O | | 9.2.2.1 | Transport Layer Addresses for Indirect X2 SCTP end-point. | |
| >Transport Layer Address | O | | 9.2.2.1 | Transport Layer Addresses for Indirect X2 user plane end-point. | |

BASE STATION APPARATUS AND INTER-BASE-STATION GATEWAY APPARATUS

CROSS REFERENCE TO RELATED APPLICATIONS

This application is a National Stage of International Application No. PCT/JP2015/006366 filed Dec. 22, 2015, claiming priority based on Japanese Patent Application No. 2015-058155 filed Mar. 20, 2015, the contents of all of which are incorporated herein by reference in their entirety.

TECHNICAL FIELD

The present disclosure relates to radio communication and in particular to forwarding of user data packets between base stations.

BACKGROUND ART

The 3rd Generation Partnership Project (3GPP) Release 12 specifies an X2 Gateway (X2 GW) (see, for example, Non-patent Literature 1). As described in Non-patent Literature 1, the X2 GW establishes a signaling (i.e., Stream Control Transmission Protocol (SCTP)) connection with each of a plurality of (H)eNBs and these (H)eNBs exchange signaling messages (i.e., X2AP messages) through the X2 GW. The (H)eNB means an eNodeB or a Home eNodeB. The X2 GW does not terminate X2AP procedures except for the X2AP Message Transfer procedure. That is, X2AP contexts only exist in the two peer (H)eNBs, which is similar to the case where no X2 GW is present. The X2AP contexts define an "X2AP association" between peer (H)eNBs that spans over two SCTP connections.

The X2AP Message Transfer procedure is performed by the X2 GW as follows. That is, when a source (H)eNB sends an X2AP message (except the X2AP MESSAGE TRANSFER message) to a target (H)eNB through the X2 GW, the source (H)eNB encapsulates the X2AP message in an X2AP MESSAGE TRANSFER message, adds routing information (i.e., RNL Header), then sends the X2AP MESSAGE TRANSFER message to the X2 GW. The routing information (i.e., RNL Header) includes both a target (H)eNB ID and a source (H)eNB ID. The X2 GW routes the X2AP MESSAGE TRANSFER message based on the target (H)eNB ID.

The X2 interface is an inter-base-station interface in the 3GPP Release 8 and subsequent releases. The X2 interface includes a control plane (signaling) interface (i.e., X2-C interface) and a user plane (data plane) interface (i.e., X2-U interface). The X2-C interface is used, for example, for preparation of a handover between base stations (i.e., X2 handover), control of Dual connectivity (e.g., establishment, modification, and release of a UE context; and management of an X2 user plane tunnel), and various settings and maintenance related to adjacent eNBs. The X2-C interface uses the X2AP protocol and uses the SCTP and the Internet Protocol (IP) to transfer X2AP signaling messages. The X2AP protocol is referred to as a Radio Network Layer (RNL) protocol and the SCTP/IP, which is used to transfer the X2AP protocol, is referred to as a Transport Network Layer (TNL) protocol.

Meanwhile, the X2-U interface is used, for example, to forward user data packets from a source (H)eNB to a target (H)eNB during a handover, and transfer user data packets (i.e., Packet Data Convergence Protocol (PDCP) PDUs) between a Master eNB (MeNB) and a Secondary eNB (SeNB) in Dual connectivity. The X2-U interface uses the GPRS Tunnelling Protocol User Plane (GTP-U) protocol and uses the User Datagram Protocol (UDP) and the IP to transfer GTP Protocol Data Units (GTP-PDUs). The GTP-U protocol is an RNL protocol for the user plane (U-plane) and the UDP/IP, which is used to transfer the GTP-U PDU, is a TNL protocol for the U-plane. The GTP-U and the TNL UDP/IP provide a tunnel mechanism. That is, the GTP-U encapsulates a user data packet (e.g., IP packet) with a GTP-U header, and the encapsulated user data packet (i.e., GTP-PDU) is transferred on the TNL UDP/IP layer. The user data packet is also referred to as a T-PDU. Further, although the user data packet (i.e., T-PDU) encapsulated with the GTP-U header is one of the GTP-PDUs, it is also referred to as a G-PDU to distinguish it from other GTP-PDUs containing a signaling message between GTP nodes. Further, each of the G-PDU and the GTP-U PDU (i.e., signaling message) is also referred to as a GTP-U message.

Although the 3GPP Release 12 specifies a transfer of X2AP signaling messages (X2-C) between two peer (H)eNBs through an X2 GW as described in Non-patent Literature 1, it does not specify a transfer of user data packets (X2-U). For this matter, Patent Literatures 1 and 2 disclose a transfer of user data packets between two peer (H)eNBs through an X2 GW.

Patent Literature 1 discloses that an HeNB-GW, which relays S1-MME signaling messages and user data packets between a core network (i.e., Evolved Packet Core (EPC)) and an (H)eNB, also supports the X2-C interface and X2-U interface. The HeNB-GW disclosed in Patent Literature 1 operates to relay a GTP-PDU encapsulating a user data packet (i.e., G-PDU) between two peer (H)eNBs. However, Patent Literature 1 does not describe details of the G-PDU relay operation performed by the HeNB-GW.

Patent Literature 2 discloses that a G-PDU is transferred between two (H)eNBs through an X2-GW. The X2-GW disclosed in Patent Literature 2 assigns a Tunnel Endpoint Identifier (TEID) to each of the two (H)eNBs during the preparation of a handover, and operates to change the TEID indicated in the GTP-U header of a received GTP-U PDU from one (H)eNB and send the GTP-U PDU, in which the TEID has been changed, to the other (H)eNB.

CITATION LIST

Patent Literature

Patent Literature 1: Japanese Unexamined Patent Application Publication No. 2012-227974
Patent Literature 2: Japanese Unexamined Patent Application Publication No. 2013-150204

Non Patent Literature

Non-patent Literature 1: 3GPP TS 36.300 V12.4.0 (2014-12), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", December 2014

SUMMARY OF INVENTION

Technical Problem

In the case where an inter-base-station gateway (e.g., X2-GW) is used, it may be inappropriate if a transfer of user data packets (e.g., PDCP PDUs) between base stations (e.g., DL data forwarding at the time of an inter-base-station handover (e.g., X2 handover) and transferring between an MeNB and an SeNB in Dual connectivity) is always performed through the X2-GW. For example, when the maximum or effective throughput (i.e., transmission rate) of the inter-base-station direct path (e.g., X2 interface) is sufficiently large, it may be inappropriate to always use the relay operation by the inter-base-station gateway in view of increase in delay. On the other hand, when the load of the inter-base-station direct path is high or when the inter-base-station direct path cannot be used for some reason, it may be preferable if the relay operation by the inter-base-station gateway can be selected. Further, it may be preferable if a TNL address (e.g., IP address) of one of two base stations (e.g., (H)eNBs) can be concealed from the other when a handover is performed between these two base stations. This concealment of the TNL address may be required only for a specific base station or a specific type of base stations.

In view of above, it may be preferable if a base station (e.g., (H)eNB) or an inter-base-station gateway (e.g., X2-GW) can select whether a relay operation by the inter-base-station gateway (e.g., the X2-GW) should be performed when user data packets are transferred between base stations. However, Patent Literatures 1 and 2 do not disclose any control as to whether the relay operation by the X2 GW should be performed. Note that the relay operation of user data packets by the inter-base-station gateway (e.g., X2-GW) means a transfer of user data packets between base stations (e.g., (H)eNBs) through the X2-GW.

One of the objects to be attained by embodiments disclosed herein is to provide an apparatus, a method, and a program that contribute to enabling a base station (e.g., (H)eNB) or an inter-base-station gateway (e.g., X2-GW) to select whether a relay operation by the inter-base-station gateway (e.g., X2-GW) should be performed. It should be noted that the above-described object is merely one of the objects intended to be attained by the embodiments disclosed herein. Other objects or problems and novel features will be made apparent from the following description and the accompanying drawings.

Solution to Problem

In a first aspect, a base station apparatus includes a memory and at least one processor coupled to the memory. The at least one processor is configured to send a first information element to an inter-base-station gateway. The first information element explicitly or implicitly indicates whether a relay operation is necessary. The relay operation is an operation in which the inter-base-station gateway relays a data packet destined for or sent from a radio terminal between the base station apparatus and another base station.

In a second aspect, an inter-base-station gateway apparatus includes a memory and at least one processor coupled to the memory. The at least one processor is configured to receive a first information element from at least one of a first base station and a second base station. The first information element explicitly or implicitly indicates whether a relay operation is necessary. The relay operation is an operation in which the inter-base-station gateway apparatus relays a data packet destined for or sent from a radio terminal between the first base station and the second base station.

In a third aspect, a method performed by a base station apparatus includes sending a first information element to an inter-base-station gateway. The first information element explicitly or implicitly indicates whether a relay operation is necessary. The relay operation is an operation in which the inter-base-station gateway relays a data packet destined for or sent from a radio terminal between the base station apparatus and another base station.

In a fourth aspect, a method performed by an inter-base-station gateway apparatus includes receiving a first information element to at least one of a first base station and a second base station. The first information element explicitly or implicitly indicates whether a relay operation is necessary. The relay operation is an operation in which the inter-base-station gateway apparatus relays a data packet destined for or sent from a radio terminal between the first base station and the second base station.

In a fifth aspect, a program includes a set of instructions (software codes) that, when loaded into a computer, causes the computer to perform a method according to the above-described third or fourth aspect.

Advantageous Effects of Invention

According to the above-described aspect, it is possible to provide an apparatus, a method, and a program that contribute to enabling a base station or an inter-base-station gateway to select whether a relay operation by the inter-base-station gateway should be performed.

BRIEF DESCRIPTION OF DRAWINGS

FIG. 7 is a table showing an example of combinations of operations of a source base station and an inter-base-station gateway with their activation conditions according to the first embodiment;

FIG. 8 is a table showing an example of combinations of operations of a source base station and an inter-base-station gateway with their activation conditions according to the first embodiment;

FIG. 9 is a table showing an example of combinations of operations of a target base station and an inter-base-station gateway with their activation conditions according to the first embodiment;

FIG. 10 is a table showing an example of combinations of operations of a target base station and an inter-base-station gateway with their activation conditions according to the first embodiment;

FIG. 14 shows an example of a modification to an X2AP Message Transfer message;

FIG. 15A shows another example of a modification to an X2AP Message Transfer message;

FIG. 15B shows another example of a modification to an X2AP Message Transfer message;

FIG. 17A shows an example of a modification to an X2 TNL Configuration Info message;

FIG. 17B shows an example of a modification to an X2 TNL Configuration Info message;

DESCRIPTION OF EMBODIMENTS

Specific embodiments are described hereinafter in detail with reference to the drawings. The same symbols are assigned to the same or corresponding elements throughout the drawings, and duplicated explanations are omitted as necessary.

Embodiments described below are explained mainly using specific examples with regard to a Long Term Evolution (LTE)/LTE-Advanced system. However, these embodiments are not limited to being applied to the LTE/LTE-Advanced system and may also be applied to other mobile communication networks or systems such as a 3GPP Universal Mobile Telecommunications System (UMTS), a 3GPP2 CDMA2000 system, a Global System for Mobile communications (GSM (Registered Trademark))/General packet radio service (GPRS) system, and a WiMAX system.

First Embodiment

Figure 1:
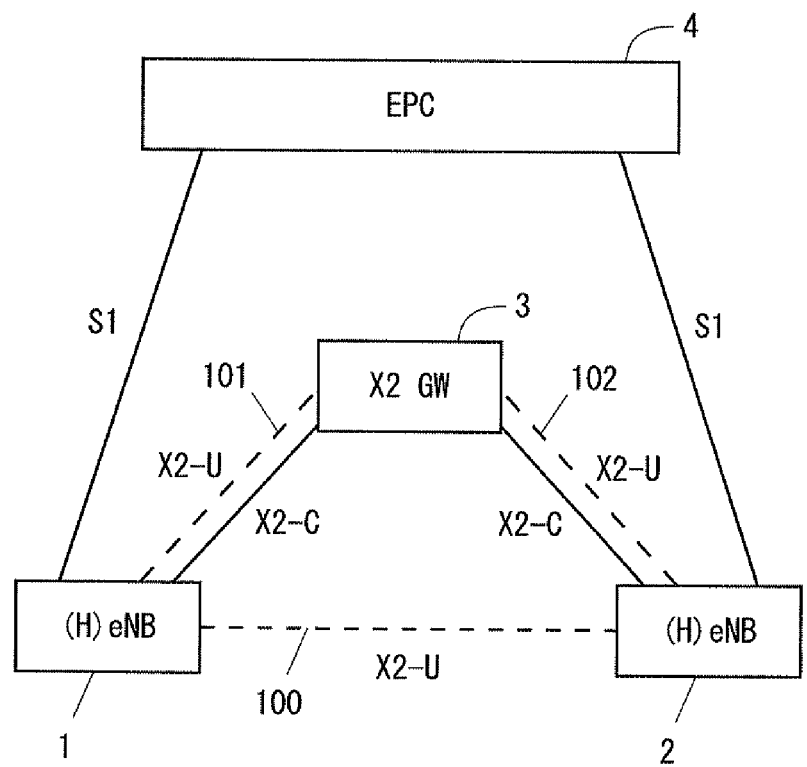
FIG. 1 shows a configuration example of a radio communication system according to some embodiments.

FIG. 1 shows a configuration example of a radio communication system according to some embodiments including this embodiment. In the example shown in FIG. 1, the radio communication system includes an (H)eNB 1, an (H)eNB 2, an X2 GW 3, and an EPC 4. The X2 GW 3 is configured to establish an SCTP connection with each of the (H)eNBs 1 and 2 to relay signaling messages (i.e., X2AP messages) between the (H)eNBs 1 and 2. The X2 GW 3 is further configured to establish a GTP-U tunnel with each of the (H)eNBs 1 and 2 to relay user data packets between the (H)eNBs 1 and 2. Each of the (H)eNBs 1 and 2 includes an X2-C interface with the X2 GW 3 and an S1 interface with the EPC 4. Note that an HeNB-GW may be used between the EPC 4 and at least one of the (H)eNBs 1 and 2. This HeNB-GW relays S1-MME signaling and user data packets (S1-U) between the EPC 4 and at least one of the (H)eNBs 1 and 2. This embodiment focuses mainly on a handover of an UE from the (H)eNB 1 to the (H)eNB 2. Accordingly, the (H)eNB 1 and the (H)eNB 2 may be referred to as the source (H)eNB and the target (H)eNB, respectively.

In this embodiment, at least one of the (H)eNBs 1 and 2 is configured to send a first Information Element (IE) to the X2 GW 3. This first information element explicitly or implicitly indicates whether a relay operation by the X2 GW 3 is necessary for forwarding user data packets of a radio terminal (User Equipment (UE)). In some implementations, when the UE is handed over from the (H)eNB 1 to the (H)eNB 2, at least one of the source (H)eNB 1 and the target (H)eNB 2 sends this first information element. In some implementations, the (H)eNB 1, the (H)eNB 2 and the UE support Dual Connectivity, and at least one of the (H)eNBs 1 and 2 sends the first information element when a bearer for the UE is established.

The relay operation by the X2 GW 3 includes transferring user data packets (i.e., T-PDUs) through the X2-U interface (i.e., GTP-U tunnel) 101 between the (H)eNB 1 and the X2 GW 3 and the X2-U interface (i.e., GTP-U tunnel) 102 between the (H)eNB 2 and the X2 GW 3. This relay operation, in which the X2 GW 3 relays user data packets, may include transferring user data packets each encapsulated with a GTP-U header (i.e., G-PDUs). The relay operation by the X2 GW 3 can also be referred to as an X2-U relay, a U-plane relay, a GTP-U relay, or a user plane concentration.

That is, the first information element is an explicit or implicit indication indicating necessity for a U-plane relay by the X2 GW 3. In some implementations, this indication is flag information that is set to different values according to whether the relay operation by the X2 GW 3 is necessary. Alternatively, in some implementations, this indication is an explicit or implicit relay request that is transmitted when the relay operation by the X2 GW 3 is necessary and is not transmitted when the relay operation is unnecessary. Alternatively, in some implementations, this indication is a combination of a plurality of information elements.

For example, as shown in the below specific examples, this indication may include an information element (e.g., Direct Path Availability IE or Direct Path Unavailability IE) that indicates availability of a direct path 100 between the (H)eNBs 1 and 2. For example, the availability of the direct path 100 may be set in advance in the (H)eNBs 1 and 2 by an operator or an Operations, Administration and Maintenance (OAM). Alternatively, the availability of the direct path 100 may be dynamically determined by the (H)eNBs 1 and 2. For example, when the direct path 100 is available but its throughput is low or when the load of the direct path 100 is high, the (H)eNBs 1 and 2 may determine that the direct path 100 cannot be used. This indication may be, for example, a combination of an information element indicating the availability of the direct path 100 and an information element (e.g., DL Forwarding IE or Uplink (UL) GTP Tunnel Endpoint IE) indicating necessity of data forwarding.

Figure 2:
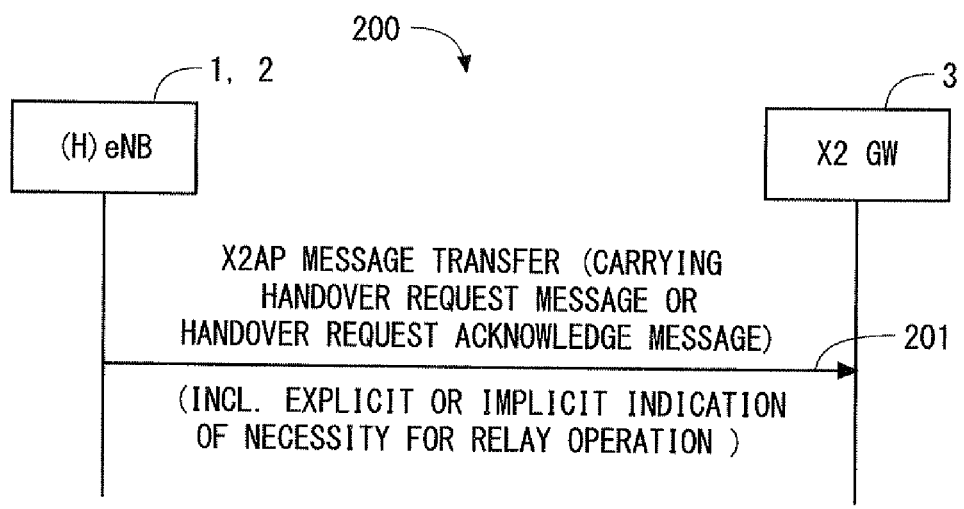
FIG. 2 is a sequence diagram showing an example of a procedure for giving a notice of necessity for a relay operation according to a first embodiment.

FIG. 2 is a sequence diagram showing an example (Process 200) of a procedure for notifying the X2 GW 3 of necessity for the relay operation. In Block 201, the (H)eNB 1 or 2 sends an X2AP Message Transfer message to the X2 GW 3. This X2AP Message Transfer message carries an X2AP Handover Request message from the source (H)eNB 1 to the target (H)eNB 2, or an X2AP Handover Request Acknowledge message from the target (H)eNB 2 to the source (H)eNB 1. Furthermore, this X2AP Message Transfer message includes an indication explicitly or implicitly indicating necessity for the X2-U relay operation by the X2 GW 3. The X2 GW 3 can recognize whether it should prepare for the X2-U relay based on this indication.

Further, in the example shown in FIG. 2, the X2 GW 3 receives the indication indicating necessity of the X2-U relay operation together with the X2AP Message Transfer message carrying the Handover Request message or the Handover Request Acknowledge message. Therefore, the X2 GW 3 can easily prepare for a GTP-U tunnel necessary for the X2-U relay by referring to this X2AP Message Transfer message.

As can be understood from the above description, in this embodiment, at least one of the (H)eNBs 1 and 2 is configured to send to the X2 GW 3 the indication explicitly or implicitly indicating whether the U-plane (X2-U) relay by the X2 GW 3 is necessary. Therefore, the X2 GW 3 can recognize whether it should perform the U-plane (X2-U) relay based on this indication.

Further, in this embodiment, at least one of the (H)eNBs 1 and 2 may be configured to, when transferring of user data packets of a radio terminal (UE) from the (H)eNB 1 to the (H)eNB 2 is needed, determine whether to use the relay operation by the X2 GW 3 for forwarding these user data packets of the UE. In other words, the (H)eNBs 1 and 2 may be configured to select which of the relay path (101 and 102) through the X2 GW 3 and the direct path (100) will be used for forwarding user data packets from the (H)eNB 1 to the (H)eNB 2. When they do not use the relay operation by the X2 GW 3, the source (H)eNB 1 may forward user data packets to the target (H)eNB 2 via the direct path between the (H)eNBs 1 and 2 (i.e., X2-U interface (GTP-U tunnel) 100).

In some implementations, when the source (H)eNB 1 determines initiation of a handover of a UE to the (H)eNB 2, it may also determine whether to use the U-plane (X2-U) relay operation by the X2 GW 3. In some implementations, when the target (H)eNB 2 receives a handover request from the source (H)eNB 1, it may determine whether to use the U-plane (X2-U) relay operation by the X2 GW 3. In some implementations, when the (H)eNB 1 receives a request for establishing a bearer for an UE that supports Dual Connectivity (e.g., S1AP: Initial Context Setup Request) from the EPC 4, it may determine whether to use the U-plane (X2-U) relay operation by the X2 GW 3. Alternatively, determination of whether the U-plane (X2-U) relay operation by the X2 GW 3 is to be used or not is performed in advance per pair of (H)eNBs.

In some implementations, one or both of the (H)eNBs 1 and 2 may select whether to use the U-plane (X2-U) relay operation by the X2 GW 3 according to the state of the direct path 100 (e.g., availability of the direct path 100, throughput of the direct path 100, or load of the direct path 100). In other words, one or both of the (H)eNBs 1 and 2 may consider the state of the direct path 100 when determining whether to use (or request) the U-plane (X2-U) relay operation by the X2 GW 3.

For example, when the maximum or effective throughput (or transmission rate) of the inter-base-station direct path 100 is larger than throughput of the path 101 (or 102) between the (H)eNB 1 (or 2) and the X2 GW 3, it may not be appropriate to use the relay operation by the inter-base-station gateway in view of increase in delay. Therefore, when the throughput of the inter-base-station direct path 100 is sufficiently larger than that of the path 101 between the (H)eNB 1 and the X2 GW 3 or larger than that of the path 102, the (H)eNB 1 or 2 may determine not to use the U-plane (X2-U) relay operation by the X2 GW 3. In this way, it is possible to prevent increase in delay that would otherwise be caused by the unnecessary U-plane relay.

In some implementations, the (H)eNB 1 may use the U-plane (X2-U) relay operation by the X2 GW 3 when it is necessary to conceal the TNL address (e.g., IP address) of the (H)eNB 1 from the (H)eNB 2, and may perform forwarding through the direct path 100 when it is unnecessary to conceal its TNL address. Similarly, the (H)eNB 2 may select whether to use the U-plane (X2-U) relay operation by the X2 GW 3 based on necessity for concealing the TNL address (e.g., IP address) of the (H)eNB 2 from the (H)eNB 1. In other words, one or both of the (H)eNBs 1 and 2 may consider the necessity for concealing the TNL address when determining whether to use (or request) the U-plane (X2-U) relay operation by the X2 GW 3.

For example, the source (H)eNB 1 may need to conceal its TNL address (e.g., IP address) from the target (H)eNB 2 when performing a handover. Conversely, the target (H)eNB 2 may need to conceal its TNL address (e.g., IP address) from the source (H)eNB 1. The TNL address may be required to be concealed only from a specific base station or a specific type of base stations.

HeNBs are installed in premises or buildings of end-users, rather than in buildings (sites) administered by telecommunications carriers. Accordingly, there is a risk that HeNBs may be altered by malicious users and, thus it may be hard to ensure sufficient security for HeNBs. Therefore, providing the X2-U TNL address of a macro eNB to an HeNB at the time of a handover could lead to a security risk such as a Denial of Service (DoS) attack to the macro eNB. For example, when the source (H)eNB 1 is a macro eNB and the target (H)eNB 2 is an HeNB, the source (H)eNB 1 may determine to use the U-plane (X2-U) relay operation by the X2 GW 3. In contrast to this, when the source (H)eNB 1 is a macro eNB and the target (H)eNB 2 is also a macro eNB, the source (H)eNB 1 may determine not to use the U-plane (X2-U) relay operation by the X2 GW 3. In this way, it is possible to prevent a security risk that would otherwise arise if an HeNB is informed of an X2-U TNL address of a macro eNB.

In some implementations, one or both of the (H)eNBs 1 and 2 may select whether to use the U-plane (X2-U) relay operation by the X2 GW 3 based on the U-plane Relay Capability of the X2 GW 3. In other words, one or both of the (H)eNBs 1 and 2 may consider the presence or absence of the U-plane capability of the X2 GW 3 when determining whether to use (or request) the U-plane (X2-U) relay operation by the X2 GW 3.

As can be understood from the above description, in this embodiment, at least one of the (H)eNBs 1 and 2 may be configured to determine whether to use the U-plane (X2-U) relay operation by the X2 GW 3 when a UE is handed over from the (H)eNB 1 to the (H)eNB 2. In this way, at least one of the (H)eNBs 1 and 2 can select whether to use the U-plane (X2-U) relay operation by the X2 GW 3.

Figure 3:
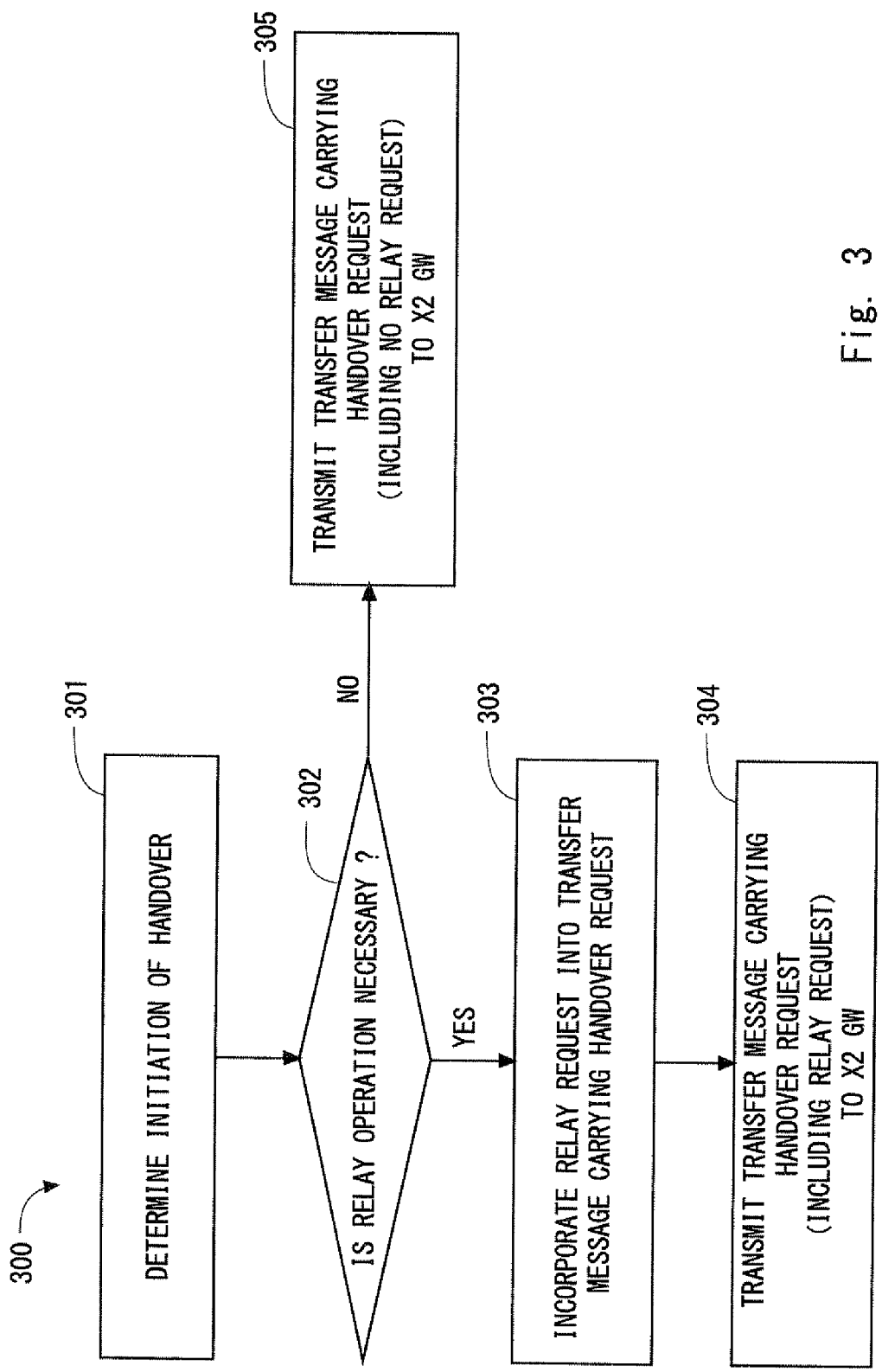
FIG. 3 is a flowchart showing an example of an operation of a source base station according to the first embodiment.

Next, a specific example of operations of the source (H)eNB 1, the X2 GW 3, and the target (H)eNB 2 are described. FIG. 3 is a flowchart showing an example (Process 300) of an operation of the source (H)eNB 1. In Block 301, the (H)eNB 1 determines initiation of a handover of a UE to the target (H)eNB 2. In Block 302, the (H)eNB 1 determines whether the U-plane (X2-U) relay operation by the X2 GW 3 is necessary at the time of the handover. When the U-plane (X2-U) relay operation is necessary (YES at Block 302), the source (H)eNB 1 incorporates an explicit or implicit relay request into a transfer message (i.e., X2AP Message Transfer message) that carries a handover request (i.e., Handover Request message) (Block 303). In Block 304, the source (H)eNB 1 sends to the X2 GW 3 the transfer message, which carries the handover request and contains the relay request. On the other hand, when the U-plane (X2-U) relay operation is unnecessary (NO at Block 302), the source (H)eNB 1 sends to the X2 GW 3 the transfer message, which carries the handover request, but does not contain the relay request (Block 305).

Figure 4:
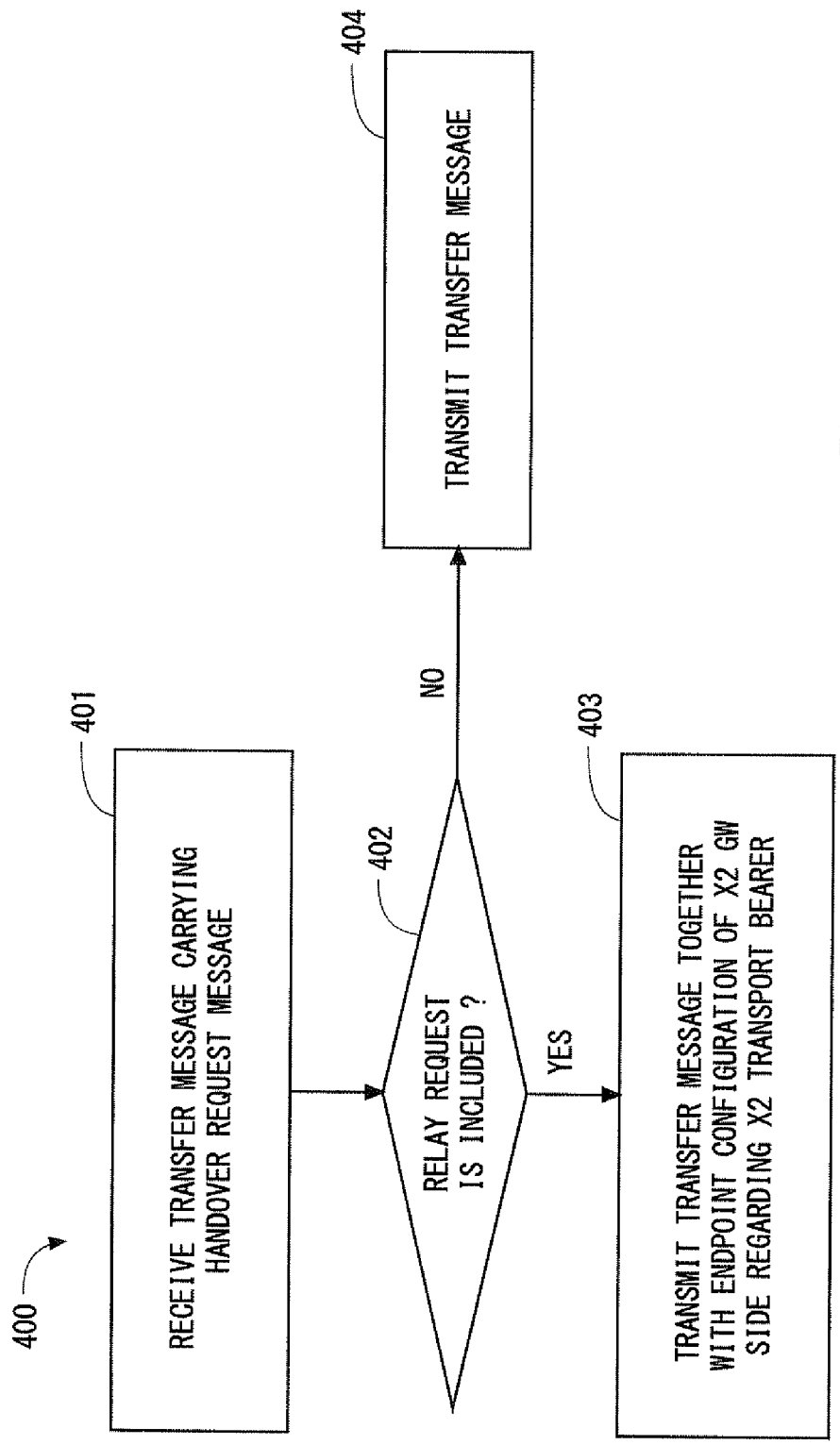
FIG. 4 is a flowchart showing an example of an operation of an inter-base-station gateway according to the first embodiment.

FIG. 4 is a flowchart showing an example (Process 400) of an operation of the X2 GW 3. In Block 401, the X2 GW 3 receives a transfer message (i.e., X2AP Message Transfer message) carrying a handover request (i.e., Handover Request message) from the source (H)eNB 1. In Block 402, the X2 GW 3 checks whether the received transfer message includes a relay request or not. When the transfer message includes the relay request (YES at Block 402), the X2 GW 3 adds in the transfer message, which carries the handover request, an indication indicating that the U-plane (X2-U) relay by the X2 GW 3 is to be performed and then sends this transfer message to the target (H)eNB 2.

In some implementations, this indication indicating that the U-plane (X2-U) relay by the X2 GW 3 is to be performed may be simple flag information indicating whether the U-plane (X2-U) relay is to be performed or not. Additionally or alternatively, as shown in Block 403 in FIG. 4, this indication indicating that the U-plane (X2-U) relay by the X2 GW 3 is to be performed may include an endpoint configuration of the X2 GW 3 side regarding an X2 transport bearer (i.e., GTP-U bearer). The endpoint configuration includes a TNL address (e.g., IP address) and a TEID. This endpoint configuration may include only a DL GTP tunnel endpoint configuration regarding an X2 transport bearer used for forwarding downlink (DL) user data packets, or may further include a UL GTP tunnel endpoint configuration regarding an X2 transport bearer used for forwarding uplink (UL) user data packets.

The above-described operation in which the X2 GW 3 sends the endpoint configuration of the X2 GW 3 side regarding the X2 transport bearer(s) (i.e., GTP-U bearer(s)) to the target (H)eNB 2 together with the transfer message carrying the handover request provides, for example, the following advantages. In some implementations, the target (H)eNB 2 may have Access Control List (ACL) functionality. When the ACL functionality is applied to the target (H)eNB 2, the target (H)eNB 2 accepts a connection from a sending node only when the source address of the sending node is already known in the target (H)eNB 2. Accordingly, if the target (H)eNB 2 does not know the X2-U TNL address of the X2 GW 3, the target (H)eNB 2 may discard TNL UDP/IP packets that carries G-PDUs and are transmitted from the X2 GW 3 because of its ACL functionality. To prevent this, the X2 GW 3 preferably notifies the target (H)eNB 2 of the endpoint configuration of the X2 GW 3 side regarding the X2 transport bearer (i.e., GTP-U bearer) in advance, though the X2 GW 3 is on the upstream side of the data forwarding. In this way, the target (H)eNB 2 can update its ACL so as to accept a connection from the X2-U TNL address of the X2 GW 3. The ACL can also be referred to as a packet filter or a firewall configuration.

Referring back to FIG. 4, when the transfer message does not include the relay request (No at Block 402), the X2 GW 3 sends the transfer message received from the source (H)eNB 1 to the target (H)eNB 2 without adding any information thereto (Block 404). That is, the transfer message sent in Block 404 does not include the indication indicating that the U-plane (X2-U) relay by the X2 GW 3 is to be performed.

Figure 5:
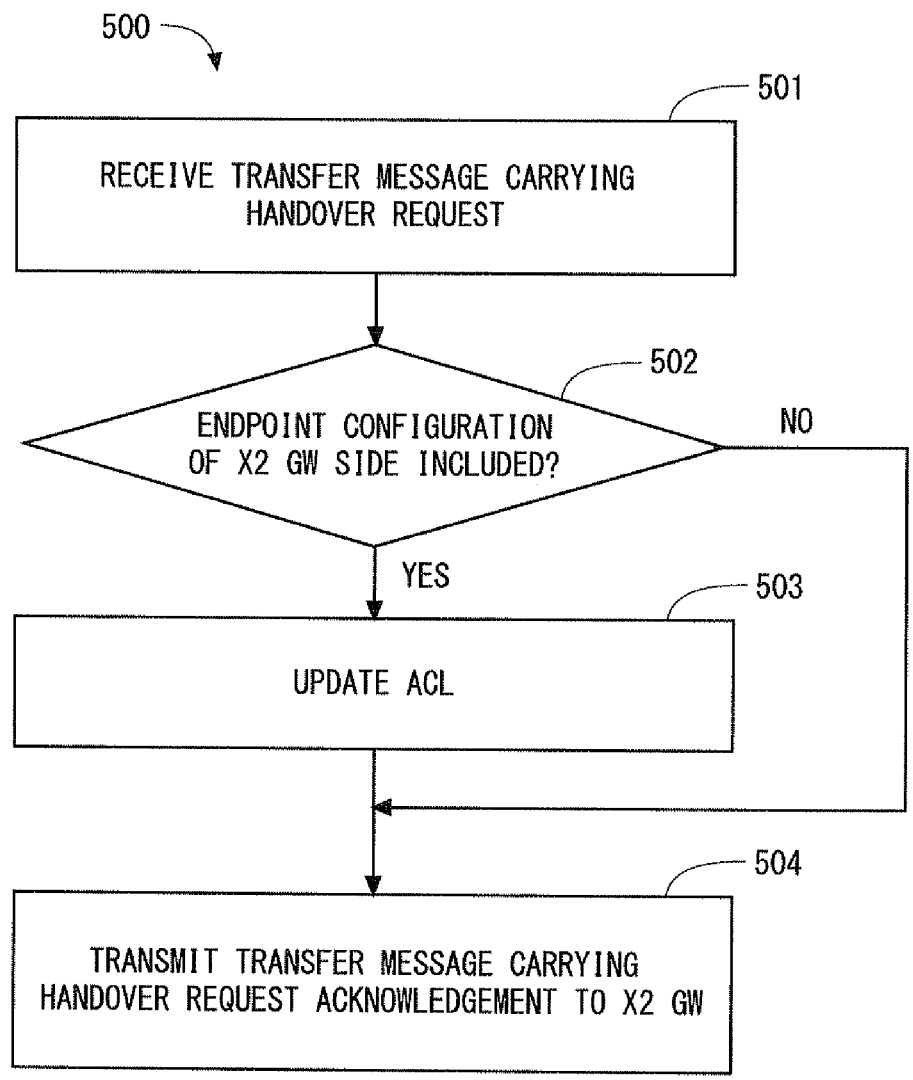
FIG. 5 is a flowchart showing an example of an operation of a target base station according to the first embodiment.

FIG. 5 is a flowchart showing an example (Process 500) of an operation of the target (H)eNB 2. In Block 501, the target (H)eNB 2 receives a transfer message (i.e., X2AP Message Transfer message) carrying a handover request (i.e., Handover Request message) from the X2 GW 3. In Block 502, the target (H)eNB 2 checks whether the received transfer message includes an endpoint configuration of the X2 GW 3 side regarding an X2 transport bearer (i.e., GTP-U bearer). When the transfer message includes the endpoint configuration of the X2 GW 3 side (YES at Block 503), the target (H)eNB 2 updates its ACL so as to accept a connection from the X2-U TNL address of the X2 GW 3.

In Block 504, the target (H)eNB 2 sends a transfer message (i.e., X2AP Message Transfer message) carrying a handover request acknowledgement (i.e., Handover Request Acknowledge message) to the X2 GW 3. The handover request acknowledgement (i.e., Handover Request Acknowledge message) includes a DL GTP tunnel endpoint configuration of the target (H)eNB 2. Further, when UL data forwarding is performed in addition to the DL data forwarding, the handover request acknowledgement (i.e., Handover Request Acknowledge message) includes a UL GTP tunnel endpoint configuration of the target (H)eNB 2. The DL GTP tunnel endpoint configuration of the target (H)eNB 2 includes a TNL address and a TEID regarding a GTP-U tunnel for receiving DL user data packets forwarded from the source (H)eNB 1. The UL GTP tunnel endpoint configuration of the target (H)eNB 2 includes a TNL address and a TEID regarding a GTP-U tunnel for receiving a UL user data packet forwarded from the source (H)eNB 1.

Note that the transfer message carrying the handover request acknowledge message sent in Block 504 may include an additional information element indicating a GTP tunnel endpoint configuration of the target (H)eNB 2 which is the same as that described in the handover request acknowledge message. Although this message structure is redundant, it has an advantage that the X2 GW 3 does not have to decode or refer to the handover request acknowledge message.

The operations of the source (H)eNB 1, the X2 GW 3, and the target (H)eNB 2 shown in FIGS. 3 to 5 are merely examples and may be modified as appropriate. For example, the message used to send the relay request in FIG. 3 may be an X2AP message other than the X2AP Message Transfer message. For example, the relay request may be embedded in the Handover Request message that is carried by the X2AP Message Transfer message. With regard to FIG. 4, the message used to send the endpoint configuration of the X2 GW 3 may be an X2AP message other than the X2AP Message Transfer message. For example, the endpoint configuration of the X2 GW 3 may be embedded in the Handover Request message that is carried by the X2AP Message Transfer message.

FIGS. 3 to 5 show examples in which the source (H)eNB 1 determines whether to use (or request) the U-plane (X2-U) relay by the X2 GW 3 at the time of a handover. Similarly, when receiving the handover request from the source (H)eNB 1 through the X2 GW 3, the target (H)eNB 2 may determine whether to use (or request) the U-plane (X2-U) relay by the X2 GW 3. That is, the target (H)eNB 2 may determine necessity of the U-plane (X2-U) relay by the X2 GW 3 independently from the determination of necessity of the U-plane (X2-U) relay made by the source (H)eNB 1.

Figure 6:
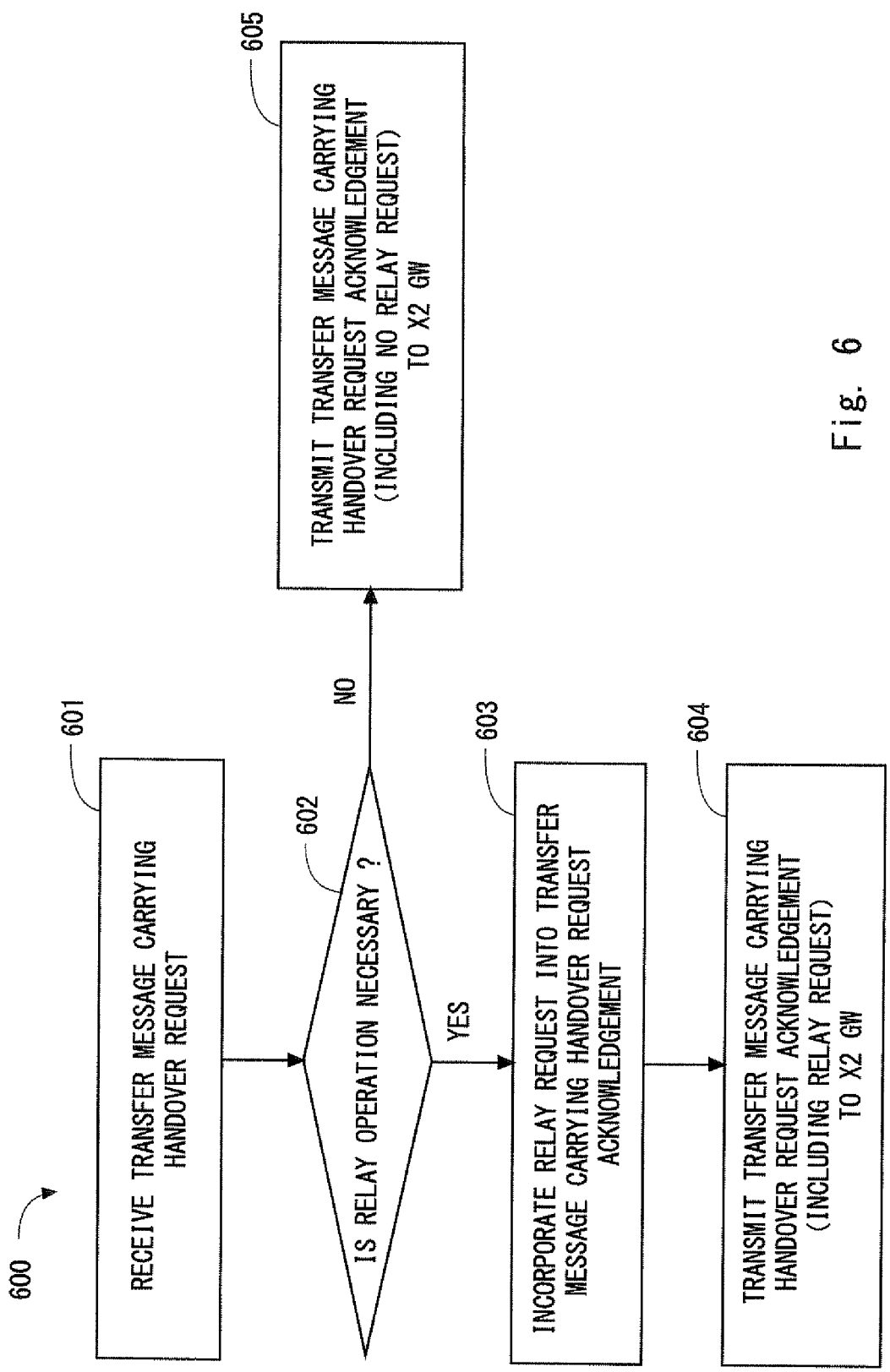
FIG. 6 is a flowchart showing an example of an operation of a target base station according to the first embodiment.

FIG. 6 is a flowchart showing an example (Process 600) of an operation including a determination by the target (H)eNB 2 of the necessity of the U-plane (X2-U) relay. In Block 601, the target (H)eNB 2 receives a transfer message (i.e., X2AP Message Transfer message) carrying a handover request (i.e., Handover Request message) from the X2 GW 3. In Block 602, the target (H)eNB 2 determines whether the U-plane (X2-U) relay operation by the X2 GW 3 is necessary. When the U-plane (X2-U) relay operation is necessary (YES at Block 602), the target (H)eNB 2 incorporates an explicit or implicit relay request into a transfer message (i.e., X2AP Message Transfer message) carrying a handover request acknowledgement (i.e., Handover Request Acknowledge message) (Block 603). In Block 604, the target (H)eNB 2 sends to the X2 GW 3 the transfer message, which carries the handover request acknowledgement and includes the relay request. On the other hand, when the U-plane (X2-U) relay operation is unnecessary (NO at Block 602), the target (H)eNB 2 sends to the X2 GW 3 the transfer message, which carries the handover request acknowledgement, but does not include the relay request (Block 605).

The operation in the X2 GW 3 when it receives from the target (H)eNB 2 the transfer message which carries the handover request acknowledgement and includes the relay request may be similar to that shown in FIG. 4. However, as described above with reference to FIG. 5, the handover request acknowledgement (i.e., Handover Request Acknowledge message) includes the GTP tunnel endpoint configuration of the target (H)eNB 2. In some implementations, in the process corresponding to Block 403, the X2 GW 3 may rewrite the GTP tunnel endpoint configuration of the target (H)eNB 2 embedded in the Handover Request Acknowledge message with a GTP tunnel endpoint configuration of the X2 GW 3.

Alternatively, in the process corresponding to Block 403, the X2 GW 3 may not make any modification to the GTP tunnel endpoint configuration of the target (H)eNB 2 embedded in the Handover Request Acknowledge message and may incorporate, into the X2AP Message Transfer message, an additional information element indicating the endpoint configuration of the X2 GW 3. In this case, the source (H)eNB 1 may update its X2 transport bearer context in accordance with the additional information element and ignore the GTP tunnel endpoint configuration of the target (H)eNB 2 described in the Handover Request Acknowledge message.

Note that when the U-plane (X2-U) relay by the X2 GW 3 is performed to conceal the TNL address of the target (H)eNB 2 from the source (H)eNB 1, the X2 GW 3 preferably modifies the GTP tunnel endpoint configuration of the target (H)eNB 2 described in the Handover Request Acknowledge message. In this way, it is possible to certainly conceal the TNL address of the target (H)eNB 2 from the source (H)eNB 1.

FIGS. 3 to 6 show specific examples of the operations of the (H)eNBs 1 and 2 and the X2 GW 3 in a handover. However, as can be understood from the above description, the specific examples of the operations of the (H)eNBs 1 and 2 and the X2 GW 3 described with reference to FIGS. 3 to 6 may be applied to the case when a bearer related to a UE supporting Dual Connectivity is established. For example, the (H)eNB 1 may determine whether to use the U-plane (X2-U) relay operation by the X2 GW 3 in response to receiving from the EPC 4 a request for establishing a bearer related to a UE supporting Dual Connectivity. Then, the (H)eNB 1 may incorporate the explicit or implicit relay request into a transfer message (i.e., X2AP Message Transfer message) carrying an X2AP message for establishing a UE context for Dual Connectivity.

Next, specific examples of operations of the source (H)eNB 1 and the X2 GW 3, and their activation conditions are described with reference to FIGS. 7 and 8. FIG. 7 is a table showing an example of combinations of operations of the source (H)eNB 1 and the X2 GW 3 with their activation conditions. In the example shown in FIG. 7, the source (H)eNB 1 considers the availability of the direct path 100 (Direct Path Availability) and the relay capability of the X2 GW 3 (U-plane Relay Capability) to determine whether to use (or request) the U-plane (X2-U) relay.

In the Case 1 shown in FIG. 7, the direct path 100 is available and the X2 GW 3 has the relay capability. In the Case 2 shown in FIG. 7, the direct path 100 is available and the X2 GW 3 does not have the relay capability. In the Cases 1 and 2, since the direct path 100 is available, the source (H)eNB 1 does not incorporate the explicit or implicit relay request to the X2 GW 3 into the X2AP Message Transfer message (carrying the Handover Request message). Therefore, the X2 GW 3 does not perform the U-plane (X2-U) relay for DL data forwarding.

In the Case 3 shown in FIG. 7, the direct path 100 is unavailable and the X2 GW 3 has the relay capability. In the Case 3, since the X2 GW 3 has the relay capability, though the direct path 100 is unavailable, the source (H)eNB 1 incorporates the explicit or implicit relay request to the X2 GW 3 into the X2AP Message Transfer message (carrying the Handover Request message). Therefore, the X2 GW 3 performs the U-plane (X2-U) relay for DL data forwarding.

In the Case 4 shown in FIG. 7, the direct path 100 is unavailable and the X2 GW 3 does not have the relay capability. In the Case 4, since X2-U data forwarding cannot be performed, the source (H)eNB 1 does not incorporate the explicit or implicit relay request to the X2 GW 3 into the X2AP Message Transfer message (carrying the Handover Request message). Therefore, the X2 GW 3 does not perform the U-plane (X2-U) relay for DL data forwarding.

Note that as already described, in some implementations, the implicit relay request (or the relay indication) to the X2 GW 3 may include a combination of a plurality of information elements. For example, as shown in FIG. 8, the implicit relay request (or the relay indication) to the X2 GW 3 may be a combination of the Direct Path Unavailability IE and the DL Forwarding IE. The Direct Path Unavailability IE shown in FIG. 8 is set when the direct path 100 is unavailable. The Direct Path Unavailability IE may be one-bit flag information. The DL Forwarding IE shown in FIG. 8 may be the DL Forwarding IE contained in the X2AP: Handover Request message specified in the current 3GPP specifications, or may be an information element newly added in the X2AP Message Transfer message.

The Cases 1 to 4 shown in FIG. 8 correspond to the Cases 1 to 4 shown in FIG. 7, respectively. That is, in the Case 1 shown in FIG. 8, the direct path 100 is available and the X2 GW 3 has the relay capability. In the Case 2 shown in FIG. 8, the direct path 100 is available and the X2 GW 3 does not have the relay capability. In the Cases 1 and 2, since the direct path 100 is available, the source (H)eNB 1 does not set the Direct Path Unavailability IE. However, the source (H)eNB 1 sets the DL Forwarding IE to inform the target (H)eNB 2 that DL forwarding (through the direct path 100) is to be performed.

In the Case 3 shown in FIG. 8, the direct path 100 is unavailable and the X2 GW 3 has the relay capability. In the Case 3, since the direct path 100 is unavailable, the source (H)eNB 1 sets the Direct Path Unavailability IE. Further, in the Case 3, since the X2 GW 3 has the relay capability, though the direct path 100 is unavailable, the source (H)eNB 1 determines that it can perform DL forwarding through the X2 GW 3 and, accordingly, sets the DL Forwarding IE to inform the target (H)eNB 2 that DL forwarding (through the X2 GW 3) is to be performed.

In the Case 4 shown in FIG. 8, the direct path 100 is unavailable and the X2 GW 3 does not have the relay capability. Therefore, in the Case 4, the source (H)eNB 1 sets the Direct Path Unavailability IE but does not set the DL Forwarding IE.

In the example shown in FIG. 8, the X2 GW 3 refers to the Direct Path Unavailability IE and the DL Forwarding IE, and performs the U-Plane (X2-U) relay for DL data forwarding when both of the two information elements are set. Therefore, similarly to the example shown in FIG. 7, the U-Plane (X2-U) relay for DL data forwarding is performed only in the Case 3 in FIG. 8 and is not performed in the Cases 1, 2 and 4 in FIG. 8.

Next, specific examples of operations of the target (H)eNB 2 and the X2 GW 3, and their activation conditions are described with reference to FIGS. 9 and 10. FIG. 9 is a table showing an example of combinations of operations of the target (H)eNB 2 and the X2 GW 3 with their activation conditions. The example related to the target (H)eNB 2 shown in FIG. 9 corresponds to the example related to the source (H)eNB 1 shown in FIG. 7. Therefore, the U-Plane (X2-U) relay for UL data forwarding is performed only in the Case 3 in FIG. 9 and is not performed in the Cases 1, 2 and 4 in FIG. 9.

In the example shown in FIG. 10, the implicit relay request (or the relay indication) to the X2 GW 3 from the target (H)eNB 2 is a combination of the Direct Path Unavailability IE and the UL GTP Tunnel Endpoint IE. The UL GTP Tunnel Endpoint IE shown in FIG. 10 may be the UL GTP Tunnel Endpoint IE contained in an X2AP: Handover Request Acknowledge message specified in the current 3GPP specifications, or may be an information element newly added in the X2AP Message Transfer message.

The example related to the target (H)eNB 2 shown in FIG. 10 corresponds to the example related to the source (H)eNB 1 shown in FIG. 8, except for the difference between the DL Forwarding IE and the UL GTP Tunnel Endpoint IE. That is, in the example shown in FIG. 10, the X2 GW 3 refers to the Direct Path Unavailability IE and the UL GTP Tunnel Endpoint IE, and performs the U-Plane (X2-U) relay for UL data forwarding when both of the two information elements are set. Therefore, the U-Plane (X2-U) relay for UL data forwarding is performed only in the Case 3 in FIG. 10 and is not performed in the Cases 1, 2 and 4 in FIG. 10.

FIGS. 7 to 10 show specific examples of the operations of the (H)eNBs 1 and 2 and the X2 GW 3 in a handover. However, as can be understood from the above description, the specific examples of the operations of the (H)eNBs 1 and 2 and the X2 GW 3 described with reference to FIGS. 7 to 10 may be applied when a bearer related to a UE supporting Dual Connectivity is established.

In the examples described with reference to FIGS. 7 to 10, the (H)eNBs 1 and 2 consider the presence or absence of the relay capability of the X2 GW 3 when determining whether to use (or request) the U-plane (X2-U) relay. The presence or absence of the relay capability of the X2 GW 3 may be set in advance in the (H)eNBs 1 and 2 by an operator or an operations, administration and maintenance (OAM). Alternatively, the X2 GW 3 may notify the (H)eNBs 1 and 2 of the presence or absence of its relay capability. Specifically, the X2 GW 3 may send to the (H)eNBs 1 and 2 a signaling message including an information element (IE) indicating the presence or absence of its relay capability. In some implementations, as shown in FIGS. 11 and 12, the X2 GW 3 may inform the (H)eNBs 1 and 2 of its relay capability during a procedure for registering the (H)eNBs 1 and 2 in the X2 GW 3.

Figure 11:
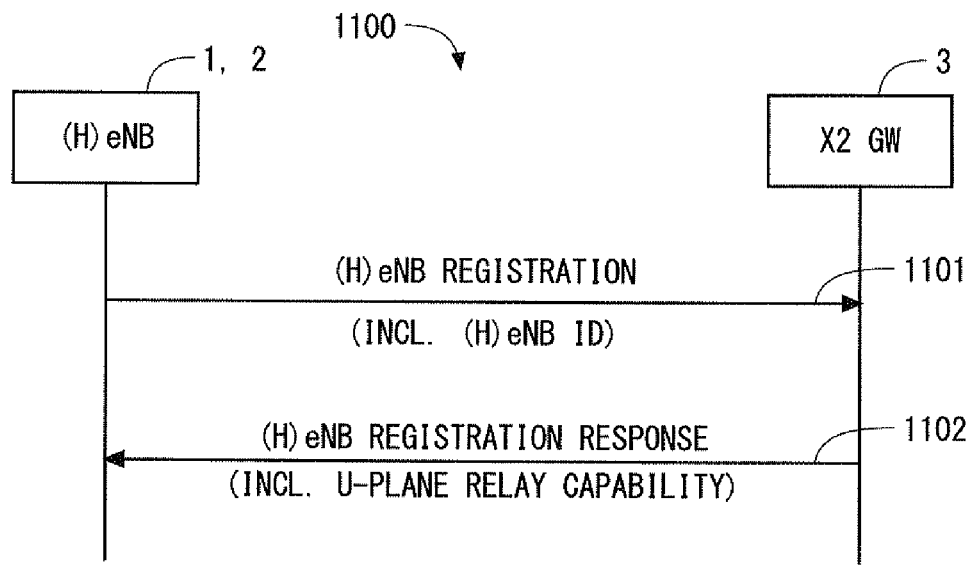
FIG. 11 is a sequence diagram showing an example of a notifying procedure of a relay capability according to the first embodiment.

FIG. 11 is a sequence diagram showing an example (Process 1100) of a procedure in which the X2 GW 3 notifies the (H)eNBs 1 and 2 of the presence or absence of its relay capability. In Block 1101, the (H)eNBs 1 (2) sends a registration request to the X2 GW 3 ((H)eNB registration). The X2 GW 3 stores mapping of the identifier of the sender (H)eNB (i.e., Global eNB ID) included in the registration request and the TNL address (e.g., IP address) of the sender (H)eNB used for the transmission of the registration request. Then, in Block 1102, the X2 GW 3 sends a response to the registration request ((H)eNB registration response). This response includes an information element indicating the presence or absence of the relay capability of the X2 GW 3 (U-plane Relay Capability). The (H)eNB 1 (2) receives the response sent in Block 1102 and thereby recognizes the presence or absence of the U-plane (X2-U) relay capability of the X2 GW 3.

Figure 12:
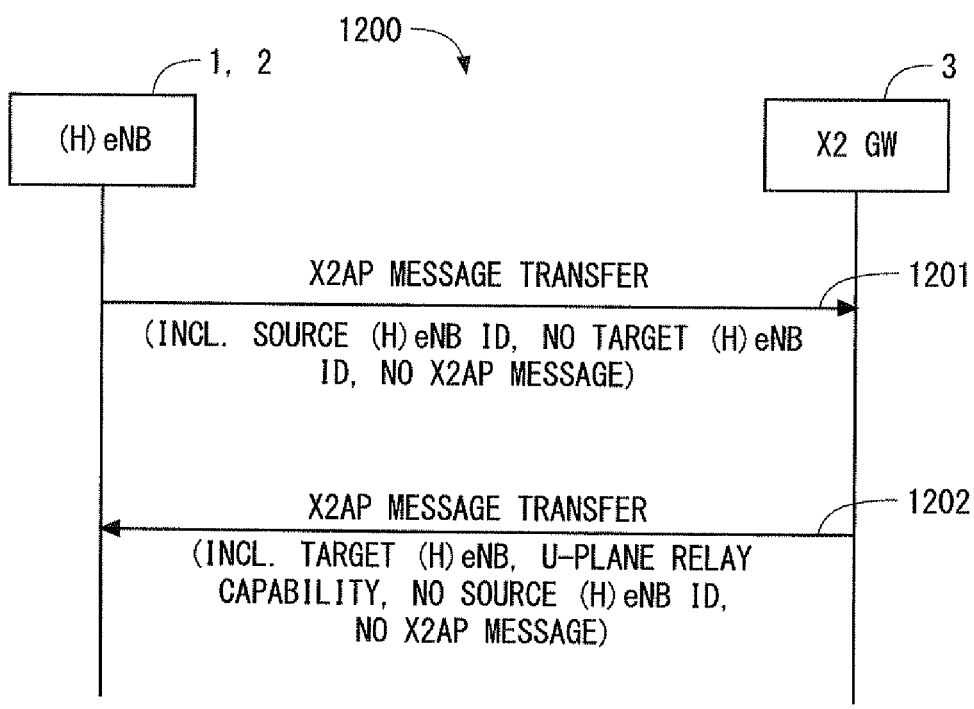
FIG. 12 is a sequence diagram showing an example of a notifying procedure of a relay capability according to the first embodiment.

FIG. 12 is a sequence diagram showing another example (Process 1200) of a procedure in which the X2 GW 3 notifies the (H)eNBs 1 and 2 of the presence or absence of the relay capability. In the 3GPP Release 12, an X2AP Message Transfer message is used to register an (H)eNB in an X2 GW. Similarly to the 3GPP Release 12, FIG. 12 shows an example in which an X2AP Message Transfer message is used. That is, in Block 1201, the (H)eNB 1 (2), which requests its registration, sends an X2AP Message Transfer message. This X2AP Message Transfer message contains a Source (H)eNB ID within its RNL Header IE, but it does not contain a Target (H)eNB ID within the RNL Header IE and also does not contain any X2AP Message. In Block 1202, the X2 GW 3 sends a modified X2AP Message Transfer message. This modified X2AP Message Transfer message contains a Target (H)eNB ID within its RNL Header IE and also contains a newly-defined U-plane Relay Capability IE, but it does not contain a Source (H)eNB ID within the RNL Header IE and also does not contain any X2AP Message. The (H)eNBs 1 (2) receives the X2AP Message Transfer message sent in Block 1202 and thereby recognizes the presence or absence of the U-plane (X2-U) relay capability of the X2 GW 3.

Figure 13A:
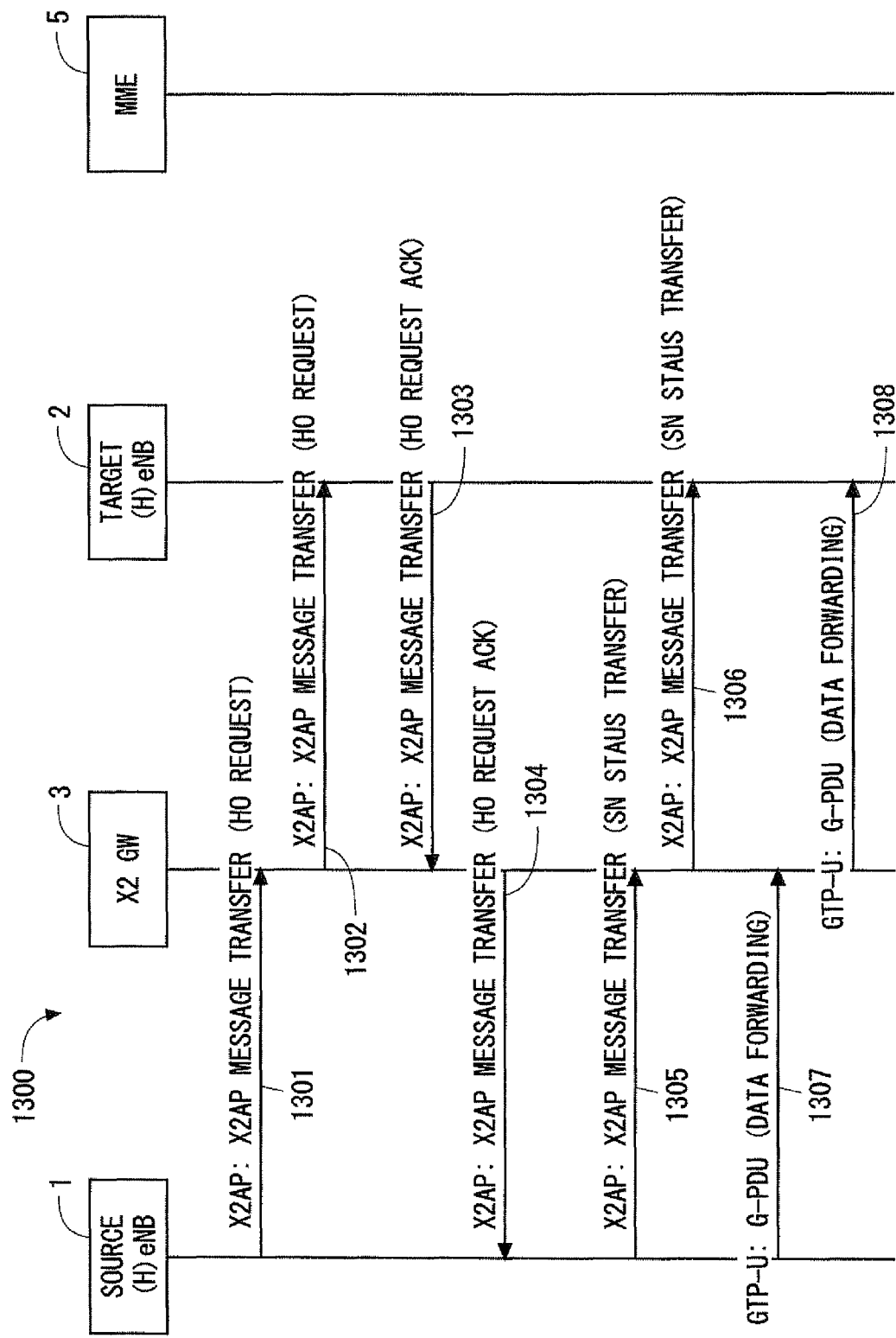
FIG. 13A is a sequence diagram showing an example of a procedure for an inter-base-station handover according to the first embodiment.
Figure 13B:
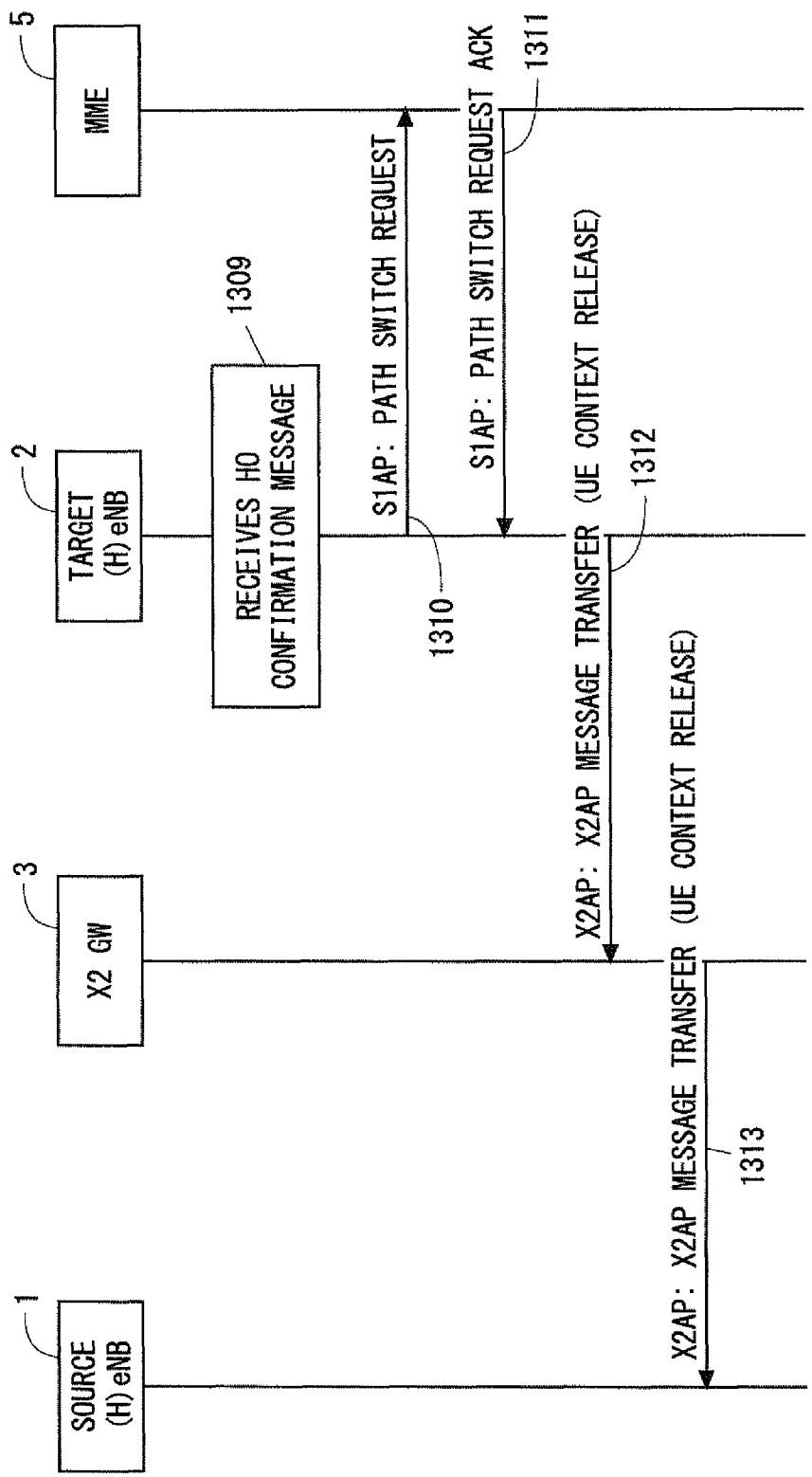
FIG. 13B is a sequence diagram showing an example of a procedure for an inter-base-station handover according to the first embodiment.

FIGS. 13A and 13B are sequence diagrams showing an example (Process 1300) of an X2 handover procedure according to this embodiment. The procedure shown in FIGS. 13A and 13B is similar to an ordinary X2 handover procedure through an X2 GW, except that user data packets is forwarded from the source (H)eNB 1 to the target (H)eNB 2 through the X2 GW 3 (Blocks 1307 and 1308). That is, in Block 1301, the source (H)eNB 1 sends to the X2 GW 3 an X2AP Message Transfer message carrying a Handover Request message. As already described, this X2AP Message Transfer message may contain an information element explicitly or implicitly indicating the necessity of the U-plane (X2-U) relay. In Block 1302, the X2 GW 3 transfers the X2AP Message Transfer message carrying the Handover Request message to the target (H)eNB 2. As already described, the X2 GW 3 may update an information element in the X2AP Message Transfer message transferred in Block 1302 (or add an information element in the X2AP Message Transfer message) according to whether to perform the U-plane (X2-U) relay.

In Block 1303, the target (H)eNB 2 sends to the X2 GW 3 an X2AP Message Transfer message carrying a Handover Request Acknowledge message. As already described, this X2AP Message Transfer message may include an information element explicitly or implicitly indicating the necessity of the U-plane (X2-U) relay. In Block 1304, the X2 GW 3 transfers the X2AP Message Transfer message carrying the Handover Request Acknowledge message to the source (H)eNB 1. As already described, the X2 GW 3 may update an information element in the X2AP Message Transfer message transferred in Block 1304 (or add an information element in the X2AP Message Transfer message) according to whether to perform the U-plane (X2-U) relay.

In response to reception of the Handover Request Acknowledge message, the source (H)eNB 1 sends a Handover Command to an UE (not shown). In Block 1305, the source (H)eNB 1 sends to the X2 GW 3 an X2AP Message Transfer message carrying an SN Status Transfer message. The SN Status Transfer message indicates a Sequence Number (SN) of an uplink/downlink Packet Data Convergence Protocol (PDCP) PDU of which the delivery to the UE has not been completed. In Block 1306, the X2 GW 3 transfers the X2AP Message Transfer message carrying the SN Status Transfer message to the target (H)eNB 2.

In Blocks 1307 and 1308, the source (H)eNB 1 forwards the uplink/downlink user data packet(s), of which the delivery to the UE has not been completed, to the target (H)eNB 2 through the X2 GW 3. That is, in Block 1307, the source (H)eNB 1 sends to the X2 GW 3, through a GTP-U tunnel between the source (H)eNB 1 and the X2 GW 3, a G-PDU(s) which encapsulates the uplink/downlink user data packet(s). In Block 1308, the X2 GW 3 transfers the G-PDU(s) received from the source (H)eNB 1 to the target (H)eNB 2 through a GTP-U tunnel between the target (H)eNB 2 and the X2 GW 3.

In the data forwarding in Blocks 1307 and 1308, the X2 GW 3 updates the source TNL address (i.e., TNL address of the source (H)eNB 1) assigned to the G-PDU(s) received from the source (H)eNB 1 by the TNL address of the X2 GW 3 and also updates the source TEID (i.e., TEID of the source (H)eNB 1) by the TEID of the X2 GW 3. Further, the X2 GW 3 updates the target TNL address (i.e., TNL address of the X2 GW 3) assigned to the G-PDU(s) received from the source (H)eNB 1 by the TNL address of the (H)eNB 2 and also updates the target TEID (i.e., TEID of the X2 GW 3) by the TEID of the target (H)eNB 2.

In Block 1309, the target (H)eNB 2 receives a Handover Confirm message from the UE. As a result of this, the UE can transmit UL user data packets to the target (H)eNB 2 and receive DL user data packets from the target (H)eNB 2.

In Block 1310, the target (H)eNB 2 informs the EPC 4 of a change of the serving cell of the UE and sends an S1AP: Path Switch Request message to the EPC 4 (i.e., Mobility Management Entity (MME) 5) to request a change of the route of the Evolved Packet System (EPS) bearer. The MME 5 performs signaling with a Serving Gateway (S-GW) (not shown) and thereby modifies the route of the EPS bearer (i.e., route of the S1 bearer). In Block 1311, the MME 5 sends an S1AP: Path Switch Request Acknowledge message to the target (H)eNB 2. In Block 1312, in response to reception of the Path Switch Request Acknowledge message, the target (H)eNB 2 sends to the X2 GW 3 an X2AP Message Transfer message carrying a UE Context Release message. In Block 1313, the X2 GW 3 transfers the X2AP Message Transfer message carrying the UE Context Release message to the source (H)eNB 1. In response to reception of the UE Context Release message, the source (H)eNB 1 releases the radio resources allocated to the UE.

Note that in response to transmission of the UE Context Release message (Block 1312), the target (H)eNB 2 may release its GTP-U tunnel configuration for the data forwarding. In response to reception of the X2AP Message Transfer message carrying the UE Context Release message (Block 1312), the X2 GW 3 may release its GTP-U tunnel configuration for the data forwarding. In response to reception of the UE Context Release message (Block 1313), the source (H)eNB 1 may release its GTP-U tunnel configuration for the data forwarding.

Next, specific examples of a modification to the X2AP Message Transfer message are described with reference to FIG. 14 and FIGS. 15A and 15B. FIG. 14 shows an example of a modification to the X2AP Message Transfer message. The "U-Plane Relay Capability" IE is used by the X2 GW 3 to inform the (H)eNBs 1 and 2 of the presence or absence of its U-plane (X2-U) relay capability. The "Direct Path Unavailability" IE is used by the (H)eNBs 1 and 2 to inform the X2 GW 3 of the availability of the direct path 100. The "E-RABs To Be Setup List" IE is used by the X2 GW 3 to inform the (H)eNBs 1 and 2 of the Endpoint configuration of the X2 GW 3.

The "E-RABs To Be Setup List" IE includes the "E-RABs To Be Setup Item" IE. The "E-RABs To Be Setup Item" IE includes the "E-RAB ID" IE, the "UL GTP Tunnel Endpoint" IE, and the "DL GTP Tunnel Endpoint" IE. The "UL GTP Tunnel Endpoint" IE indicates the Endpoint configuration (i.e., TNL address and TEID) of the X2 GW 3 regarding the X2 transport bearer for UL data (i.e., UL PDUs) forwarding. The "DL GTP Tunnel Endpoint" IE indicates the Endpoint configuration (i.e., TNL address and TEID) of the X2 GW 3 regarding the X2 transport bearer for DL data (i.e., DL PDUs) forwarding.

FIGS. 15A and 15B show another example of a modification to the X2AP Message Transfer message. As shown in FIG. 15A, the X2AP Message Transfer message is extended to include the "Message Type of X2AP Message" IE. The "Message Type of X2AP Message" IE indicates the type of the X2AP message carried by the X2AP Message Transfer message. In this way, the X2 GW 3 can operate so as to refer to or decode only a necessary X2AP message(s). Specifically, the X2 GW 3 may refer to or decode the "X2AP message" IE within the X2AP Message Transfer message, only when the "Message Type of X2AP Message" IE indicates the Handover Request message or the Handover Request Acknowledge message.

Additionally or alternatively, as shown in FIG. 15B, the X2AP Message Transfer message is extended to include the "DL Forwarding" IE. The "DL Forwarding" IE is used by the source (H)eNB 1 when the "X2AP message" IE carries a Handover Request message. This "DL Forwarding" IE indicates the same content as the "DL Forwarding" IE that is contained in the Handover Request message embedded within the "X2AP message" IE. In this way, the X2 GW 3 does not have to decode or refer to the Handover Request message in the "X2AP message" IE to check the "DL Forwarding" IE.

According to this, the X2AP Message Transfer message may be extended to include the "E-RAB Level QoS Parameters" IE as shown in FIG. 15B. The "E-RAB Level QoS Parameters" IE is used by the source (H)eNB 1 when the "X2AP message" IE carries a Handover Request message. The "E-RAB Level QoS Parameters" IE indicates the same content as the "E-RAB Level QoS Parameters" IE that is contained in the Handover Request message embedded within the "X2AP message" IE.

Further, according to this, the "E-RAB ID" IE shown in FIG. 15B may be used by the source (H)eNB 1 when the "X2AP message" IE carries a Handover Request message. In this case, the "E-RAB ID" IE indicates the same content as the "E-RAB ID" IE that is contained in the Handover Request message embedded within the "X2AP message" IE. Further, the "E-RAB ID" IE shown in FIG. 15B may be used by the target (H)eNB 2 when the "X2AP message" IE carries a Handover Request Acknowledge message. In this case, the "E-RAB ID" IE indicates the same content as the "E-RAB ID" IE that is contained in the Handover Request Acknowledge message embedded within the "X2AP message" IE.

Still further, according to this, the "DL GTP Tunnel Endpoint" IE and the "UL GTP Tunnel Endpoint" IE shown in FIG. 15B may be used by the target (H)eNB 2 when the "X2AP message" IE carries a Handover Request Acknowledge message. In this case, the "DL GTP Tunnel Endpoint" IE and the "UL GTP Tunnel Endpoint" IE indicate the same contents as the "DL GTP Tunnel Endpoint" IE and the "UL GTP Tunnel Endpoint" IE that are contained in the Handover Request Acknowledge message embedded within the "X2AP message" IE.

As described above, by incorporating, into the X2AP Message Transfer message, one or more information elements that the X2 GW 3 needs to refer to for the U-plane (X2-U) relay out of the information elements contained in the Handover Request message and the Handover Request Acknowledge message, the following advantage is obtained. That is, the X2 GW 3 only needs to transfer the X2AP Message IE in a transparent manner and does not need to refer to or decode the X2AP Message IE. If the X2 GW 3 always has to refer to or decode the X2AP Message IE, it may considerably consume the processing power of the X2 GW 3, or a protocol error may occur due to the difference in the X2AP protocol version between the X2 GW 3 and the (H)eNBs. The X2 GW 3 can prevent the occurrence of such problems by transferring the X2AP Message IE in a transparent manner.

Note that as shown in FIGS. 15A and 15B, when an information element(s) having the same contents as the information elements contained in the Handover Request message or the Handover Request Acknowledge message is added in the X2AP Message Transfer message, this added information element(s) (e.g., at least one of "DL Forwarding" IE, "E-RAB Level QoS Parameters" IE, "E-RAB ID" IE, "DL GTP Tunnel Endpoint" IE, and "UL GTP Tunnel Endpoint" IE) may be used as the implicit relay request (or relay indication). That is, the X2 GW 3 may detect the presence or absence of the relay request from the (H)eNB 1 or 2 according to whether the X2AP Message Transfer message includes the added information element(s). In this case, the X2AP Message Transfer message does not necessarily have to include the "Direct Path Unavailability" IE (or other explicit or implicit relay requests).

Second Embodiment

This embodiment provides a specific example of a procedure for informing the target (H)eNB 2 of the X2-U TNL address (e.g., IP address) of the X2 GW 3. In the first embodiment, an example in which the X2-U TNL address of the X2 GW 3 is set in the target (H)eNB 2 by the OAM and an example in which the X2-U TNL address of the X2 GW 3 is sent from the X2 GW 3 to the target (H)eNB 2 by using an X2AP Message Transfer message are shown. As an alternative of these examples, an improved Enhanced TNL Address Discovery procedure may be used.

The Enhanced TNL Address Discovery procedure is specified in Section 4.6.6.1 of Non-patent Literature 1. In the Enhanced TNL Address Discovery procedure, an (H)eNB incorporates the TNL address of the X2 GW, to which this (H)eNB is connected, into the S1AP: eNB CONFIGURATION TRANSFER message and sends the eNB CONFIGURATION TRANSFER message including the TNL address of the X2 GW to an MME. The MME acquires the target eNB ID and the TNL address of the X2 GW contained in the received eNB CONFIGURATION TRANSFER message and transfers the TNL address of the X2 GW to the target eNB ID by using the S1AP: MME CONFIGURATION TRANSFER message. In this way, the two (H)eNBs can share the TNL address of the X2 GW and use indirect X2 through the X2 GW.

However, it should be noted that the TNL address of the X2 GW that is transferred through the existing Enhanced TNL Address Discovery procedure is the TNL address for transferring X2AP signaling messages via the SCTP connection (i.e., X2-C TNL address). In this embodiment, the existing Enhanced TNL Address Discovery procedure is modified to transfer the TNL address (i.e., X2-U TNL address) of the X2 GW used for transferring TNL UDP/IP packets carrying G-PDUs.

Figure 16:
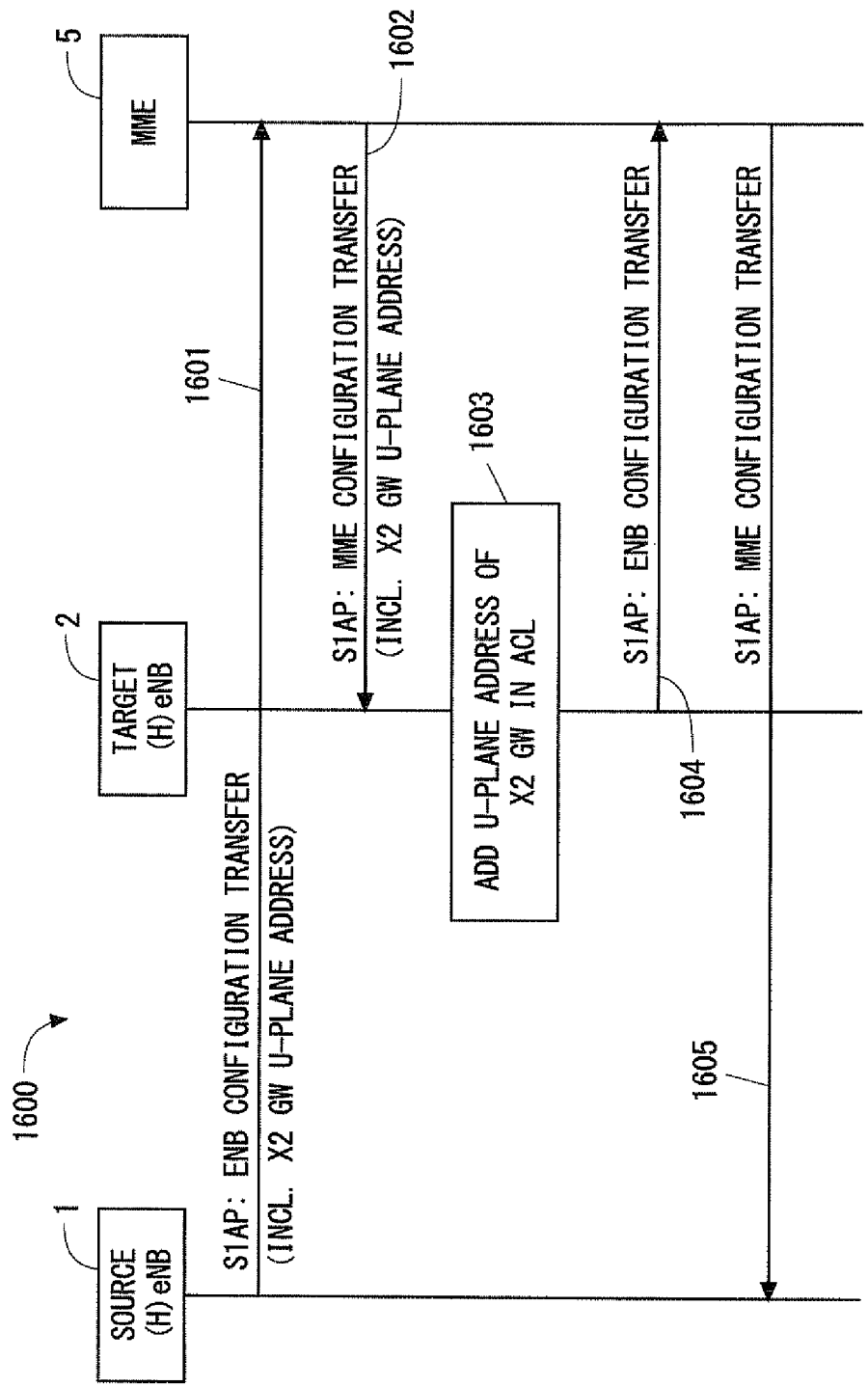
FIG. 16 is a sequence diagram showing an example of a procedure for notifying a target base station of an address of an inter-base-station gateway according to a third embodiment.

FIG. 16 is a sequence diagram showing an example (Process 1600) of an Enhanced TNL Address Discovery procedure according to this embodiment. The procedure shown in FIG. 16 is similar to the existing Enhanced TNL Address Discovery procedure, except that the X2 GW U-plane address (i.e., X2-U TNL address) is sent. That is, in Block 1601, the source (H)eNB 1 sends an S1AP: eNB CONFIGURATION TRANSFER message to the MME 5. This eNB CONFIGURATION TRANSFER message includes the U-plane address of the X2 GW 3 (i.e., X2-U TNL address). In Block 1602, the MME 5 sends an S1AP: MME CONFIGURATION TRANSFER message to the target (H)eNB 2. This MME CONFIGURATION TRANSFER message includes the U-plane address (i.e., X2-U TNL address) of the X2 GW 3 received from the source (H)eNB 1.

In Block 1603, the target (H)eNB 2 adds the received U-plane address (i.e., X2-U TNL address) of the X2 GW 3 in its ACL. In Block 1604, the target (H)eNB 2 sends an S1AP: eNB CONFIGURATION TRANSFER message to the MME 5. This eNB CONFIGURATION TRANSFER message is a response for the source (H)eNB 1. In Block 1605, the MME 5 sends an S1AP: MME CONFIGURATION TRANSFER to the source (H)eNB 1. This MME CONFIGURATION TRANSFER message includes the information element that is received from the target (H)eNB 2 by the eNB CONFIGURATION TRANSFER message (e.g., the U-plane address of the X2 GW 3 that the target (H)eNB 2 has received from the source (H)eNB 1).

FIGS. 17A and 17B show a specific example of a modification to the "X2 TNL Configuration Info" IE specified in Section 9.2.3.29 of 3GPP TS 36.413 V12.4.0. The "X2 TNL Configuration Info" IE is included in the S1AP: eNB CONFIGURATION TRANSFER message and the S1AP: MME CONFIGURATION TRANSFER message. As shown in FIG. 17B, the "X2 TNL Configuration Info" IE may be extended so as to include the "Transport Layer Address" IE indicating the TNL address regarding the indirect X2 U-plane endpoint (i.e., X2-U TNL address of the X2 GW 3).

Figure 18:
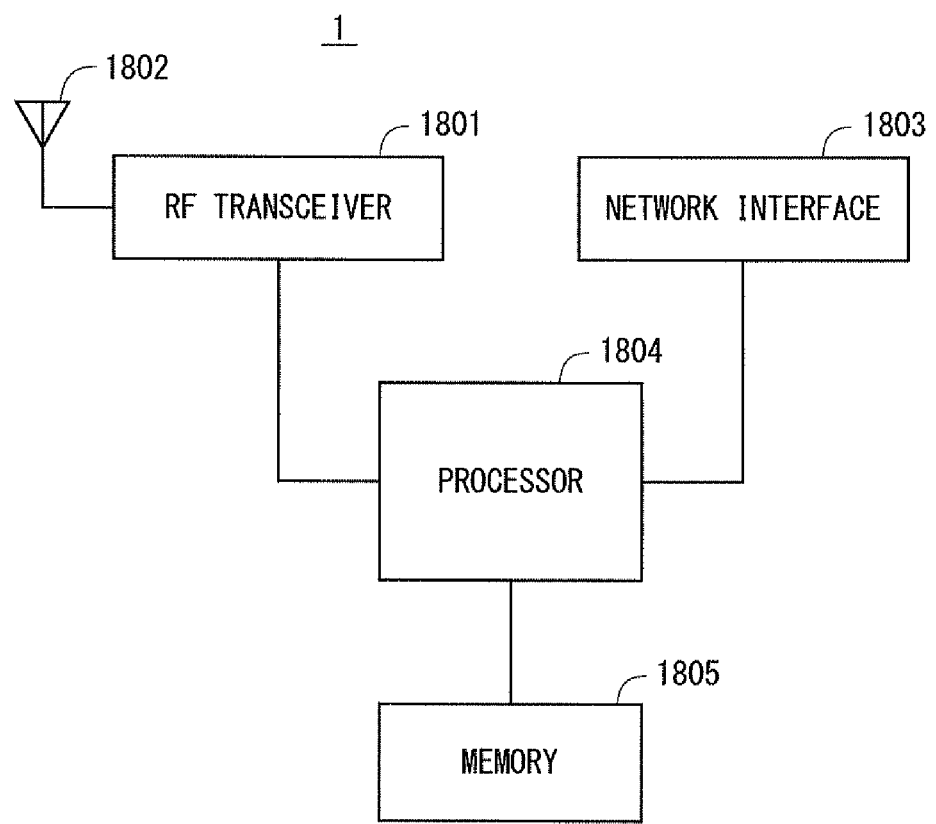
FIG. 18 is a block diagram showing a configuration example of a base station according to some embodiments.

Lastly, configuration examples of the (H)eNBs 1 and 2 and the X2 GW 3 according to the above embodiments are described. FIG. 18 is Block diagram showing a configuration example of the (H)eNB 1. The (H)eNB 2 may have a configuration similar to that shown in FIG. 18. As shown in FIG. 18, the (H)eNB 1 includes an RF transceiver 1801, a network interface 1803, a processor 1804, and a memory 1805. The RF transceiver 1801 performs analog RF signal processing to communicate with UEs. The RF transceiver 1801 may include a plurality of transceivers. The RF transceiver 1801 is connected to an antenna 1802 and the processor 1804. The RF transceiver 1801 receives modulated symbol data (or OFDM symbol data) from the processor 1804, generates a transmission RF signal, and supplies the generated transmission RF signal to the antenna 1802. Further, the RF transceiver 1801 generates a baseband reception signal based on a reception RF signal received by the antenna 1802 and supplies this signal to the processor 1804.

The network interface 1803 is used to communicate with a network node (e.g., MME and S/P-GW). The network interface 1803 may include, for example, a network interface card (NIC) conforming to the IEEE 802.3 series.

The processor 1804 performs data-plane processing (including digital baseband signal processing and control-plane processing for radio communication. For example, in the case of LTE or LTE-Advanced, the digital baseband signal processing performed by the processor 1804 may include signal processing of the PDCP layer, RLC layer, MAC layer, and PHY layer. Further, the signal processing performed by the processor 1804 may include signal processing of the GTP-U•UDP/IP layer in the X2-U interface and S1-U interface. Further, the control plane processing performed by the processor 1804 may include processing of the X2AP protocol, S1-MME protocol, and RRC protocol.

The processor 1804 may include a plurality of processors. For example, the processor 1804 may include a modem-processor (e.g., DSP) that performs the digital baseband signal processing, a processor (e.g., DSP) that performs the signal processing of the GTP-U.UDP/IP layer in the X2-U interface and S1-U interface, and a protocol-stack-processor (e.g., CPU or MPU) that performs the control-plane processing.

The memory 1805 is composed of a combination of a volatile memory and a nonvolatile memory. The memory 1805 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or a combination thereof. The memory 1805 may include a storage located apart from the processor 1804. In this case, the processor 1804 may access the memory 1805 through the network interface 1803 or an I/O interface (not shown).

The memory 1805 may store a software module (i.e., computer program) including a set of instructions and data to perform processing performed by the (H)eNB 1 described in the above embodiments. In some implementations, the processor 1804 may be configured to load the software module from the memory 1805 and executing the loaded software module, thereby performing processing of the (H)eNB 1 described in the above embodiments.

Figure 19:
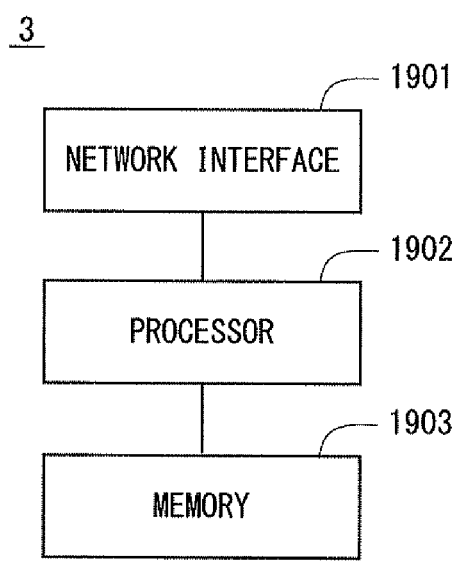
FIG. 19 is a block diagram showing a configuration example of an inter-base-station gateway according to some embodiments.

FIG. 19 is Block diagram showing a configuration example of the X2 GW 3. As shown in FIG. 16, the X2 GW 3 includes a network interface 1901, a processor 1902, and a memory 1903. The network interface 1901 is used for communication with network nodes (e.g., (H)eNBs 1 and 2). The network interface 1901 may include, for example, a network interface card (NIC) conforming to the IEEE 802.3 series.

The processor 1902 loads software (i.e., computer program) from the memory 1903 and executes the loaded software, thereby performing processing of the X2 GW 3 described in the above embodiments. The processor 1902 may be, for example, a microprocessor, an MPU, or a CPU. The processor 1902 may include a plurality of processors.

The memory 1903 is composed of a combination of a volatile memory and a nonvolatile memory. The memory 1903 may include a storage located apart from the processor 1902. In this case, the processor 1902 may access the memory 1903 through an I/O interface (not shown).

As described above with reference to FIGS. 18 and 19, each of the processors included in the (H)eNBs 1 and 2 and the X2 GW 3 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

In the examples shown the above embodiments, the GTP-U protocol is used in the X2-U interface of the X2 GW. However, a protocol different from the GTP-U protocol, such as Proxy Mobile IPv6 (PMIPv6), may be used.

The above embodiments may be applied to other radio communication systems such as a UMTS system and a GSM system. The base station ((H)eNB) described in the above embodiments may include a control node having a radio resource management function (e.g., Radio Network Controller (RNC) in UMTS or Base Station Controller (BSC) in GSM system) and a radio transmission node (e.g., NodeB in UMTS or Base transceiver station (BTS) in GSM system).

For example, as shown in 3GPP TS 25.467, when a Home NodeB (HNB) establishes an Iur connection with an RNC through a Home NodeB Gateway (HNB-GW), relocation can be performed between the HNB and the RNC through the HNB-GW. In this case, the HNB sends an RNSAP: Enhanced Relocation Request message via an Iurh interface through the HNB-GW. Then, the HNB-GW transfers the RNSAP: Enhanced Relocation Request message via an Iur interface by using a Signaling Connection Control Part (SCCP). In this case, the HNB-GW may further perform a U-plane relay between the HNB and the RNC.

The above embodiments may be applied to cases in which a gateway is used between a UMTS system and an LTE/LTE-Advanced system. For example, when a handover is performed between an HeNB of the LTE and an RNC of the UMTS, the gateway may perform a U-plane relay between the HeNB and the RNC.

The above embodiments may be applied to cases in which a gateway is used between a CDMA2000 system and an LTE/LTE-Advanced system. For example, the gateway may perform a U-plane relay when a handover is performed between an HeNB of the LTE and a base station of the CDMA2000 system.

The above embodiments may be applied to cases in which a gateway is used between a Wireless Local Area Network (WLAN) system and an LTE/LTE-Advanced system. For example, when a handover is performed between an HeNB of the LTE and an access point of the WLAN, the gateway may perform a U-plane relay between the HeNB and the access point.

Further, the above embodiments can be applied to cases in which an inter-base-station gateway is used for an inter-base-station handover in any Radio Access Technology (RAT). Further, the above embodiments can be applied to cases in which an inter-base-station gateway is used for an inter-base-station handover between any RATs.

Further, the above embodiments can be applied to cases in which an X2 gateway is used for a handover between a Relay Node (RN) and a Donor eNB (DeNB). The RN and the DeNB are described in 3GPP TS 36.300 (Non-patent Literature 1).

Further, as already described above, the above embodiments can be applied to cases in which an X2 gateway is used to transfer user data packets between a Master eNB (MeNB) and a Secondary eNB (SeNB) in the case of Dual Connectivity. The Dual Connectivity is described in 3GPP TS 36.300 (Non-patent Literature 1).

Further, the above embodiments are merely examples of applications of the technical ideas obtained by the inventor. Needless to say, these technical ideas are not limited to the above embodiments and various modifications can be made thereto.

The whole or part of the embodiments disclosed above can be described as, but not limited to, the following Supplementary notes.

(Supplementary Note 1)
A method performed by a base station apparatus, the method comprising:
considering availability of a direct path between the base station apparatus and another base station when determining whether a relay operation is necessary, the relay operation being an operation in which an inter-base-station gateway relays a data packet destined for or sent from a radio terminal between the base station apparatus and the other base station.

(Supplementary Note 2)
A method performed by a base station apparatus, the method comprising;
considering a capability of a relay operation of an inter-base-station gateway when determining whether the relay operation is necessary, the relay operation being an operation in which the inter-base-station gateway relays a data packet destined for or sent from a radio terminal between the base station apparatus and another base station.

(Supplementary Note 3)
A method performed by a base station apparatus, the method comprising:
sending a first information element to an inter-base-station gateway, wherein
the first information element indicates availability of a direct path between the base station apparatus and another base station.

(Supplementary Note 4)
A method performed by an inter-base-station gateway apparatus, the method comprising:
notifying a base station of a capability of a relay operation, wherein
the relay operation comprises relaying, by the inter-base-station gateway apparatus, a data packet destined for or sent from a radio terminal between a first base station and a second base station.

(Supplementary Note 5)
An inter-base-station gateway apparatus comprising:
a memory; and
at least one processor coupled to the memory, wherein
the at least one processor is configured to receive a first information element from at least one of a first base station and a second base station, and
the first information element explicitly or implicitly indicates whether a relay operation is necessary, the relay operation being an operation in which the inter-base-station gateway apparatus relays a data packet destined for or sent from a radio terminal between the first base station and the second base station.

(Supplementary Note 6)
The inter-base-station gateway apparatus according to Supplementary note 5, wherein the first information element explicitly indicates availability of a direct path between the first and second base stations.

(Supplementary Note 7)
The inter-base-station gateway apparatus according to Supplementary note 5 or 6, wherein the at least one processor is configured to receive the first information element when the radio terminal is handed over from the first base station to the second base station.

(Supplementary Note 8)
The inter-base-station gateway apparatus described in any one of Supplementary notes 5 to 7, wherein the at least one processor is configured to send a second information element indicating a capability of the relay operation to at least one of the first and second base stations.

(Supplementary Note 9)
The inter-base-station gateway apparatus according to Supplementary note 8, wherein the at least one processor is configured to send the second information element during a procedure for registering at least one of the first and second base stations in the inter-base-station gateway apparatus.

(Supplementary Note 10)
The inter-base-station gateway apparatus according to any one of Supplementary notes 5 to 9, wherein the at least one processor is configured to determine whether to perform the relay operation based on the first information element.

(Supplementary Note 11)
The inter-base-station gateway apparatus according to any one of Supplementary notes 5 to 10, wherein the at least one processor is configured to, when the relay operation is performed by the inter-base-station gateway apparatus, incorporate, into a first transfer message carrying a handover request message from the first base station to the second base station, an endpoint configuration of the inter-base-station gateway apparatus regarding a first transport bearer for transferring the data packet between the inter-base-station gateway apparatus and the second base station.

(Supplementary Note 12)
The inter-base-station gateway apparatus according to Supplementary note 11, wherein the endpoint configuration is used to update a packet filter in the second base station.

(Supplementary Note 13)
The inter-base-station gateway apparatus according to Supplementary note 11 or 12, wherein the endpoint configuration includes a transport-layer address of the inter-base-station gateway apparatus.

(Supplementary Note 14)

The inter-base-station gateway apparatus according to any one of Supplementary notes 11 to 13, wherein the endpoint configuration includes an endpoint configuration for downlink forwarding and an endpoint configuration for uplink forwarding.

(Supplementary Note 15)

The inter-base-station gateway apparatus according to any one of Supplementary notes 5 to 14, wherein the at least one processor is configured to, when the relay operation is performed by the inter-base-station gateway apparatus, incorporate, into a second transfer message carrying a handover request acknowledge message from the second base station to the first base station, an endpoint configuration of the inter-base-station gateway apparatus regarding a second transport bearer for transferring the data packet between the inter-base-station gateway apparatus and the first base station.

(Supplementary Note 16)

A method performed by a base station apparatus, the method comprising:

sending a first information element to an inter-base-station gateway, wherein the first information element explicitly or implicitly indicates whether a relay operation is necessary, the relay operation being an operation in which the inter-base-station gateway relays a data packet destined for or sent from a radio terminal between the base station apparatus and another base station.

(Supplementary Note 17)

The method according to Supplementary note 16, wherein the first information element explicitly indicates availability of a direct path between the base station apparatus and the other base station.

(Supplementary Note 18)

The method according to Supplementary note 16 or 17, wherein the sending comprises sending the first information element when the radio terminal is handed over from the base station apparatus to the other base station, or from the other base station to the base station apparatus.

(Supplementary Note 19)

The method according to Supplementary note 18, wherein the sending comprises incorporating the first information element into a transfer message that is to be sent to the inter-base-station gateway to carry a handover request message or handover request acknowledge message for the other base station.

(Supplementary Note 20)

The method according to Supplementary note 19, wherein the first information element implicitly indicates that the relay operation is necessary by indicating the same content as a second information element included in the handover request message or the handover request acknowledge message carried by the transfer message.

(Supplementary Note 21)

The method according to Supplementary note 19, further comprising incorporating, into the transfer message, a third information element indicating the same content as a second information element contained in the handover request message or the handover request acknowledge message carried by the transfer message.

(Supplementary Note 22)

The method according to Supplementary note 20 or 21, wherein the second information element includes at least one of: an information element indicating necessity of forwarding the data packet; an information element indicating an identifier of a bearer configured for the radio terminal; and an information element indicating a Quality of Service (QoS) parameter of the bearer.

(Supplementary Note 23)

The method according to any one of Supplementary notes 19 to 22, further comprising incorporating, into the transfer message, an information element indicating a type of an inter-base-station signaling message carried by the transfer message.

(Supplementary Note 24)

The method according to any one of Supplementary notes 16 to 23, further comprising:

determining whether to use the relay operation by the inter-base-station gateway to transmit or receive the data packet; and when the relay operation is not used, forwarding the data packet via a direct path between the base station apparatus and the other base station.

(Supplementary Note 25)

A method performed by an inter-base-station gateway apparatus, the method comprising:

receiving a first information element from at least one of a first base station and a second base station, wherein the first information element explicitly or implicitly indicates whether a relay operation is necessary, the relay operation being an operation in which the inter-base-station gateway apparatus relays a data packet destined for or sent from a radio terminal between the first base station and the second base station.

(Supplementary Note 26)

The method according to Supplementary note 25, wherein the first information element explicitly indicates availability of a direct path between the first and second base stations.

(Supplementary Note 27)

The method according to Supplementary note 25 or 26, wherein the receiving comprising receiving the first information element when the radio terminal is handed over from the first base station to the second base station.

(Supplementary Note 28)

The method according to any one of Supplementary notes 25 to 27, further comprising sending a second information element indicating a capability of the relay operation to at least one of the first and second base stations.

(Supplementary Note 29)

The method according to Supplementary note 28, wherein the sending comprises sending the second information element during a procedure for registering at least one of the first and second base stations in the inter-base-station gateway apparatus.

(Supplementary Note 30)

The method according to any one of Supplementary notes 25 to 29, further comprising determining whether to perform the relay operation based on the first information element.

(Supplementary Note 31)

The method according to any one of Supplementary notes 25 to 30, further comprising, when the relay operation is performed by the inter-base-station gateway apparatus, incorporating, into a first transfer message carrying a handover request message from the first base station to the second base station, an endpoint configuration of the inter-base-station gateway apparatus regarding a first transport bearer for transferring the data packet between the inter-base-station gateway apparatus and the second base station.

(Supplementary Note 32)

The method according to Supplementary note 31, wherein the endpoint configuration is used to update a packet filter in the second base station.

(Supplementary Note 33)

The method according to Supplementary note 31 or 32, wherein the endpoint configuration includes a transport-layer address of the inter-base-station gateway apparatus.

(Supplementary Note 34)

The method according to any one of Supplementary notes 31 to 33, wherein the endpoint configuration includes an endpoint configuration for downlink forwarding and an endpoint configuration for uplink forwarding.

(Supplementary Note 35)

The method according to any one of Supplementary notes 25 to 34, further comprising, when the relay operation is performed by the inter-base-station gateway apparatus, incorporating, into a second transfer message carrying a handover request acknowledge message from the second base station to the first base station, an endpoint configuration of the inter-base-station gateway apparatus regarding a second transport bearer for transferring the data packet between the inter-base-station gateway apparatus and the first base station.

This application is based upon and claims the benefit of priority from Japanese patent application No. 2015-058155, filed on Mar. 20, 2015, the disclosure of which is incorporated herein in its entirety by reference.

REFERENCE SIGNS LIST 1 (H)eNB
2 (H)eNB
3 X2 GATEWAY (X2 GW)
4 EVOLVED PACKET CORE (EPC)
5 MOBILITY MANAGEMENT ENTITY (MME)
1804 PROCESSOR
1805 MEMORY
1902 PROCESSOR
1903 MEMORY

The invention claimed is:

1. A base station apparatus comprising:
a memory; and
at least one processor coupled to the memory, wherein
the at least one processor is configured to send a first information element to an inter-base-station gateway,
the first information element explicitly or implicitly indicates whether a relay operation is necessary, the relay operation being an operation in which the inter-base-station gateway relays a data packet destined for or sent from a radio terminal between the base station apparatus and an other base station, and
the at least one processor is configured to, when generating the first information element, consider whether it is necessary to conceal a transport-layer address of the base station apparatus from the other base station.

2. The base station apparatus according to claim 1, wherein the first information element explicitly indicates availability of a direct path between the base station apparatus and the other base station.

3. The base station apparatus according to claim 1, wherein the at least one processor is configured to send the first information element when the radio terminal is handed over from the base station apparatus to the other base station, or from the other base station to the base station apparatus.

4. The base station apparatus according to claim 3, wherein the at least one processor is configured to incorporate the first information element into a transfer message that is to be sent to the inter-base-station gateway to carry a handover request message or handover request acknowledge message for the other base station.

5. The base station apparatus according to claim 4, wherein the first information element implicitly indicates that the relay operation is necessary by indicating the same content as a second information element included in the handover request message or the handover request acknowledge message carried by the transfer message.

6. The base station apparatus according to claim 5, wherein the second information element includes at least one of: an information element indicating necessity of forwarding the data packet; an information element indicating an identifier of a bearer configured for the radio terminal; and an information element indicating a Quality of Service (QoS) parameter of the bearer.

7. The base station apparatus according to claim 4, wherein the at least one processor is configured to incorporate, into the transfer message, a third information element indicating the same content as a second information element contained in the handover request message or the handover request acknowledge message carried by the transfer message.

8. The base station apparatus according to claim 1, wherein the at least one processor is configured to incorporate, into the transfer message, an information element indicating a type of an inter-base-station signaling message carried by the transfer message.

9. The base station apparatus according to claim 1, wherein
the at least one processor is configured to determine whether to use the relay operation by the inter-base-station gateway to transmit or receive the data packet, and
when the relay operation is not used, the data packet is forwarded via a direct path between the base station apparatus and the other base station.

10. The base station apparatus according to claim 1, wherein the at least one processor is configured to, when generating the first information element, consider whether the inter-base-station gateway has a capability of the relay operation.

11. The base station apparatus according to claim 1, wherein the at least one processor is configured to receive from the inter-base-station gateway a fourth information element indicating a capability of the relay operation.

12. The base station apparatus according to claim 11, wherein the at least one processor is configured to receive the fourth information element during a procedure for registering the base station apparatus in the inter-base-station gateway.

13. The base station apparatus according to claim 1, wherein the at least one processor is configured to, when generating the first information element, consider a state of a direct path between the base station apparatus and the other base station.

14. The base station apparatus according to claim 13, wherein the state of the direct path includes at least one of availability of the direct path, throughput of the direct path, and a load of the direct path.

15. The base station apparatus according to claim 1, wherein the at least one processor is configured to, when generating the first information element, consider a type of the other base station.

16. A method performed by a base station apparatus, the method comprising:
sending a first information element to an inter-base-station gateway, wherein
the first information element explicitly or implicitly indicates whether a relay operation is necessary, the relay operation being an operation in which the inter-base-station gateway relays a data packet destined for or sent from a radio terminal between the base station apparatus and an other base station, wherein the method further comprises, when generating the first information element, considering whether it is necessary to conceal a transport-layer address of the base station apparatus from the other base station.

* * * * *